(12) United States Patent
Pallas et al.

(10) Patent No.: US 10,627,420 B2
(45) Date of Patent: Apr. 21, 2020

(54) SYSTEMS AND METHODS FOR LOADING LIQUID SAMPLES

(71) Applicant: LIFE TECHNOLOGIES CORPORATION, Carlsbad, CA (US)

(72) Inventors: Michael C. Pallas, San Bruno, CA (US); James C. Nurse, Westport, WA (US); Gary Lim, San Francisco, CA (US); Theodore E. Straub, Burlingame, CA (US); Evan W. Foster, San Mateo, CA (US)

(73) Assignee: Life Technologies Corporation, Carlsbad, CA (US)

( * ) Notice: Subject to any disclaimer, the term of this patent is extended or adjusted under 35 U.S.C. 154(b) by 935 days.

(21) Appl. No.: 14/385,735

(22) PCT Filed: Mar. 15, 2013

(86) PCT No.: PCT/US2013/032107
§ 371 (c)(1),
(2) Date: Sep. 16, 2014

(87) PCT Pub. No.: WO2013/138724
PCT Pub. Date: Sep. 19, 2013

(65) Prior Publication Data
US 2015/0072897 A1    Mar. 12, 2015

Related U.S. Application Data

(60) Provisional application No. 61/612,008, filed on Mar. 16, 2012, provisional application No. 61/612,005, (Continued)

(51) Int. Cl.
*G01N 1/10* (2006.01)
*G01N 35/10* (2006.01)
(Continued)

(52) U.S. Cl.
CPC ...... *G01N 35/1002* (2013.01); *B01J 19/0046* (2013.01); *B01L 3/5088* (2013.01);
(Continued)

(58) Field of Classification Search
CPC ........... B01L 3/5088; B01L 2300/0819; G01N 2035/1037; G01N 2035/00158
(Continued)

(56) References Cited

U.S. PATENT DOCUMENTS 5,110,555 A     5/1992  Moore et al.
2003/0194353 A1* 10/2003 Gilbert .................. B01L 3/0244
                                                    422/520

(Continued)

FOREIGN PATENT DOCUMENTS

WO    2003/041863    5/2003
WO    2004/074818    9/2004
WO    2009/086624    7/2009

OTHER PUBLICATIONS

International Preliminary Report on Patentability for Application No. PCT/US2013/032107 dated Sep. 16, 2014.
(Continued)

*Primary Examiner* — Natalia Levkovich

(57) ABSTRACT

A sample loader for loading a liquid sample into a plurality of reaction sites within a substrate is provided. The sample loader includes a first blade, and a second blade coupled to the first blade. The sample loader further comprises a flow path between the first blade and second blade configured to dispense a liquid sample to a substrate including a plurality of reaction sites. Further, in various embodiments the liquid sample has an advancing contact angle of 85+/−15 degrees with the first and second blade. Furthermore, loading of the liquid sample dispensed from the flow path to the plurality of reaction sites may be based on capillary action.

17 Claims, 22 Drawing Sheets

Related U.S. Application Data filed on Mar. 16, 2012, provisional application No. 61/612,087, filed on Mar. 16, 2012, provisional application No. 61/723,658, filed on Nov. 7, 2012, provisional application No. 61/723,738, filed on Nov. 7, 2012, provisional application No. 61/723,759, filed on Nov. 7, 2012.

(51) Int. Cl.
    *C40B 60/14* (2006.01)
    *B01L 3/00* (2006.01)
    *B01J 19/00* (2006.01)

(52) U.S. Cl.
    CPC ....... *C40B 60/14* (2013.01); *B01J 2219/0038* (2013.01); *B01J 2219/00286* (2013.01); *B01J 2219/00317* (2013.01); *B01J 2219/00351* (2013.01); *B01J 2219/00599* (2013.01); *B01J 2219/00619* (2013.01); *B01J 2219/00637* (2013.01); *B01L 2200/0642* (2013.01); *B01L 2200/12* (2013.01); *B01L 2300/0893* (2013.01); *B01L 2300/0896* (2013.01); *B01L 2300/161* (2013.01); *B01L 2300/165* (2013.01); *B01L 2400/0406* (2013.01)

(58) Field of Classification Search
    USPC .......................................... 436/180; 422/501
    See application file for complete search history.

(56) References Cited

U.S. PATENT DOCUMENTS

2006/0233670 A1  10/2006  Lehto
2006/0233671 A1  10/2006  Beard et al.
2011/0318241 A1  12/2011  Danehy et al.

OTHER PUBLICATIONS

International Search Report and Written Opinion for Int'l Appl. No. PCT/US2013/032107 dated Mar. 5, 2014.

* cited by examiner

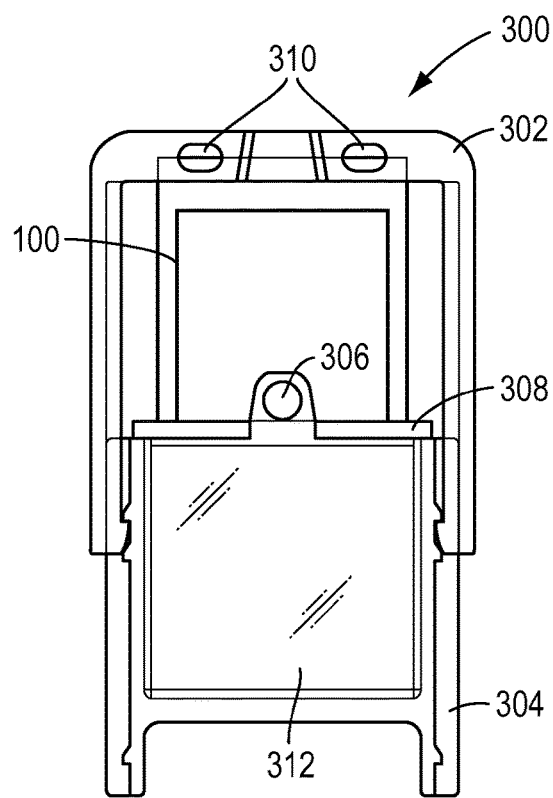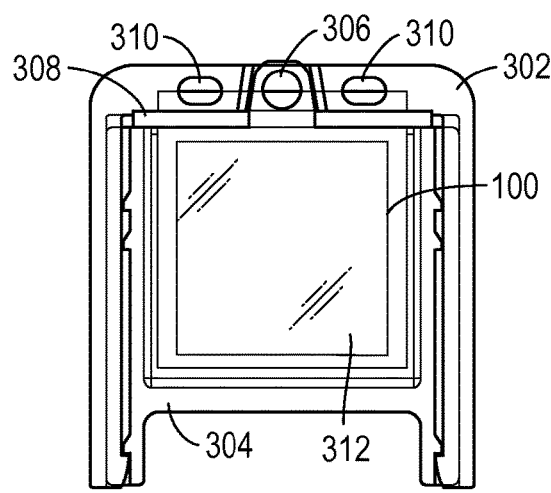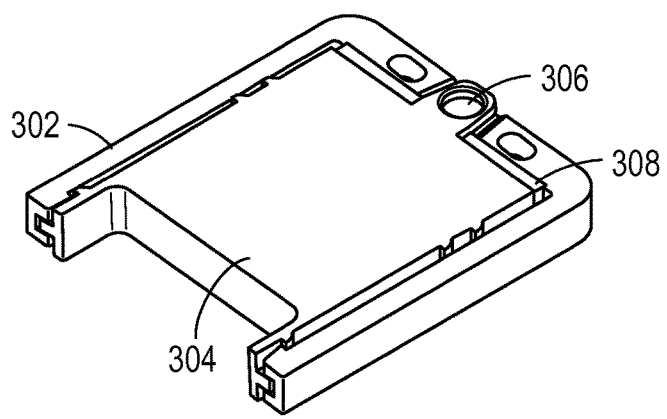

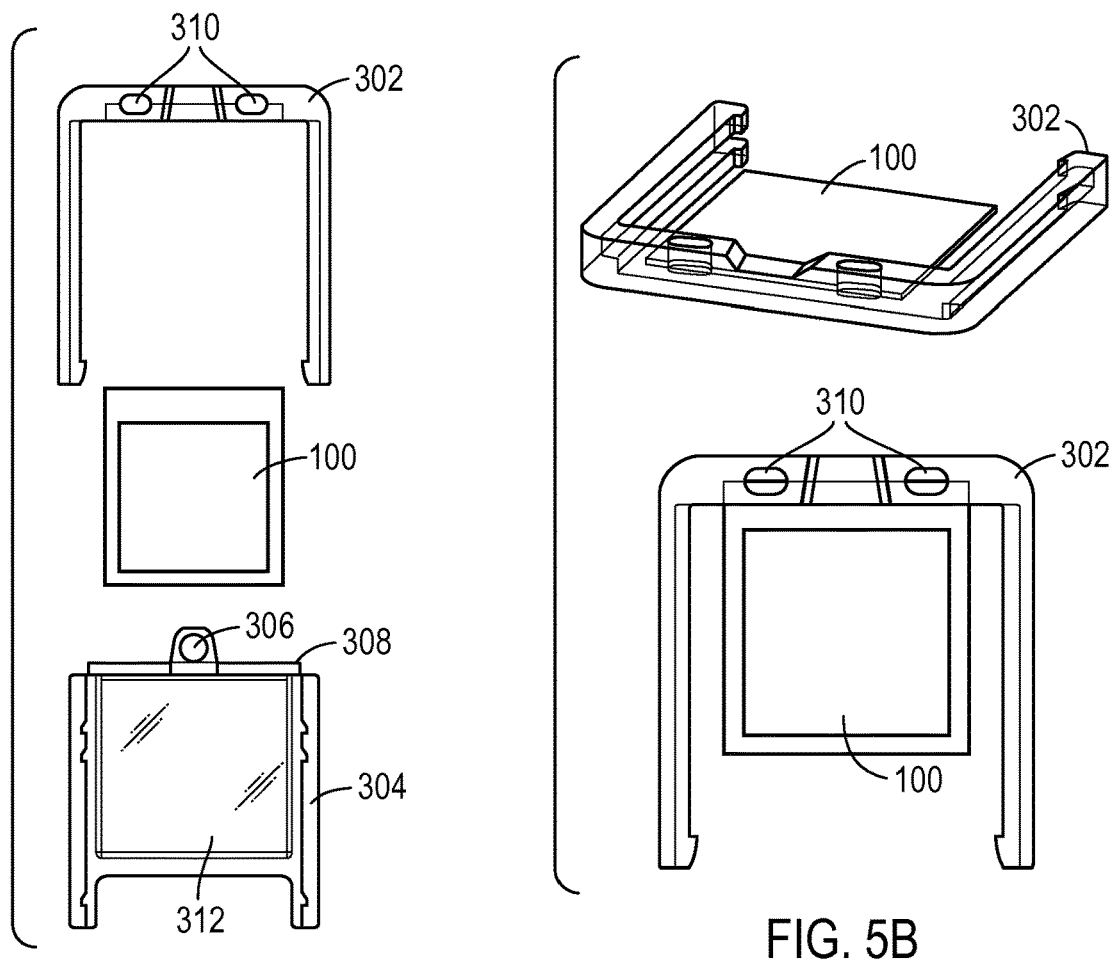
FIG. 5A
FIG. 5B
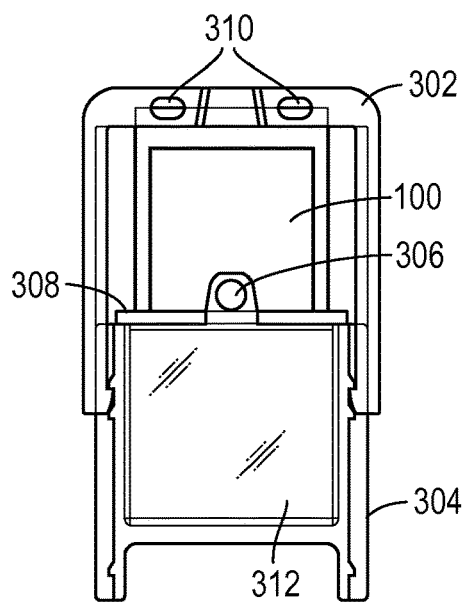
FIG. 5C

SYSTEMS AND METHODS FOR LOADING LIQUID SAMPLES

CROSS-REFERENCE TO RELATED APPLICATIONS

This application claims the benefit of priority of U.S. Provisional Patent Application No. 61/612,005, filed on Mar. 16, 2012, U.S. Provisional Patent Application No. 61/612,087, filed on Mar. 16, 2012, U.S. Provisional Patent Application No. 61/723,759, filed on Nov. 7, 2012, U.S. Provisional Patent Application No. 61/612,008, filed Mar. 16, 2012, U.S. Provisional Patent Application No. 61/723,658, filed Nov. 7, 2012, and U.S. Provisional Patent Application No. 61/723,738, filed on Nov. 7, 2012, all of which are also incorporated herein in their entirety by reference.

BACKGROUND

Polymerase Chain Reaction (PCR) is a method of amplifying a target DNA sequence. Previously, PCR has been generally performed in 96- or 384-well microplates. If higher throughputs are desired, conventional PCR methods in microplates are not cost effective or efficient. On the other hand, reducing the PCR reaction volumes lowers the consumption of reagents and may decrease amplification times from the reduced thermal mass of the reaction volumes. This strategy may be implemented in an array format (m×n), resulting in a large number of smaller reaction volumes. Furthermore, using an array allows for a scalable high throughput analysis with increased quantification sensitivity, dynamic range, and specificity.

Array formats have also been used to perform Digital Polymerase Chain Reaction (dPCR). Results from dPCR can be used to detect and quantify the concentration of rare alleles, to provide absolute quantitation of nucleic acid samples, and to measure low fold-changes in nucleic acid concentration. Generally, increasing the number of replicates increases the accuracy and reproducibility of dPCR results.

The array format in most quantitative polymerase chain reaction (qPCR) platforms is designed for sample-by-assay experiments, in which PCR results need to be addressable for post-run analysis. For dPCR, however, the specific position or well of each PCR result may be immaterial and only the number of positive and negative replicates per sample may be analyzed.

In dPCR, a solution containing a relatively small number of a target polynucleotide or nucleotide sequence may be subdivided into a large number of small test samples, such that each sample generally contains either one molecule of the target nucleotide sequence or none of the target nucleotide sequence. When the samples are subsequently thermally cycled in a PCR protocol, procedure, or experiment, the sample containing the target nucleotide sequence are amplified and produce a positive detection signal, while the samples containing no target nucleotide sequence are not amplified and produce no detection signal.

For applications as mentioned above, continuing to decrease reaction volumes may lead to challenges related to confidence in loading the array with sample volumes and maintaining the physical isolation of the sample volumes, for example. In other words, it is important to load the sample volume into as many wells or through-holes as possible and to reduce the cross-talk between the wells or through-holes.

SUMMARY

According to various embodiments described herein, a sample loader for loading a liquid sample into a plurality of reaction sites within a substrate is provided. The sample loader includes a first blade, and a second blade coupled to the first blade. The sample loader further comprises a flow path between the first blade and second blade configured to dispense a liquid sample to a substrate including a plurality of reaction sites. Further, in various embodiments the liquid sample has an advancing contact angle of 85+/−15 degrees with the first and second blade. Furthermore, loading of the liquid sample dispensed from the flow path to the plurality of reaction sites may be based on capillary action.

In other embodiments described herein, a method of loading a liquid sample into a plurality of reaction sites in a substrate. The method includes depositing a liquid sample to a reservoir of a sample loader. Then, contacting the sample loader to the substrate including the plurality of reaction sites. The method further includes laterally moving the sample loader over the plurality of reaction sites while contacting the sample loader to the substrate so that the liquid sample is deposited over the plurality of reaction sites.

DESCRIPTION OF THE FIGURES

FIG. 3A is a case for loading liquid samples into an array according to various embodiments described herein;

FIG. 3B is an exemplary view of a case for loading liquid samples with an inserted substrate including an array according to various embodiments described herein;

FIG. 3C is another exemplary view of a case for loading liquid samples with an inserted substrate including an array according to various embodiments described herein;

FIG. 5A illustrates exemplary components of a case for loading liquid samples according to various embodiments described herein;

FIG. 5B illustrates an array holder portion of the case for loading liquid samples according to embodiments described herein;

FIG. 5C illustrates an assembled case for loading according to various embodiments described herein;

DETAILED DESCRIPTION

Figure 1A:
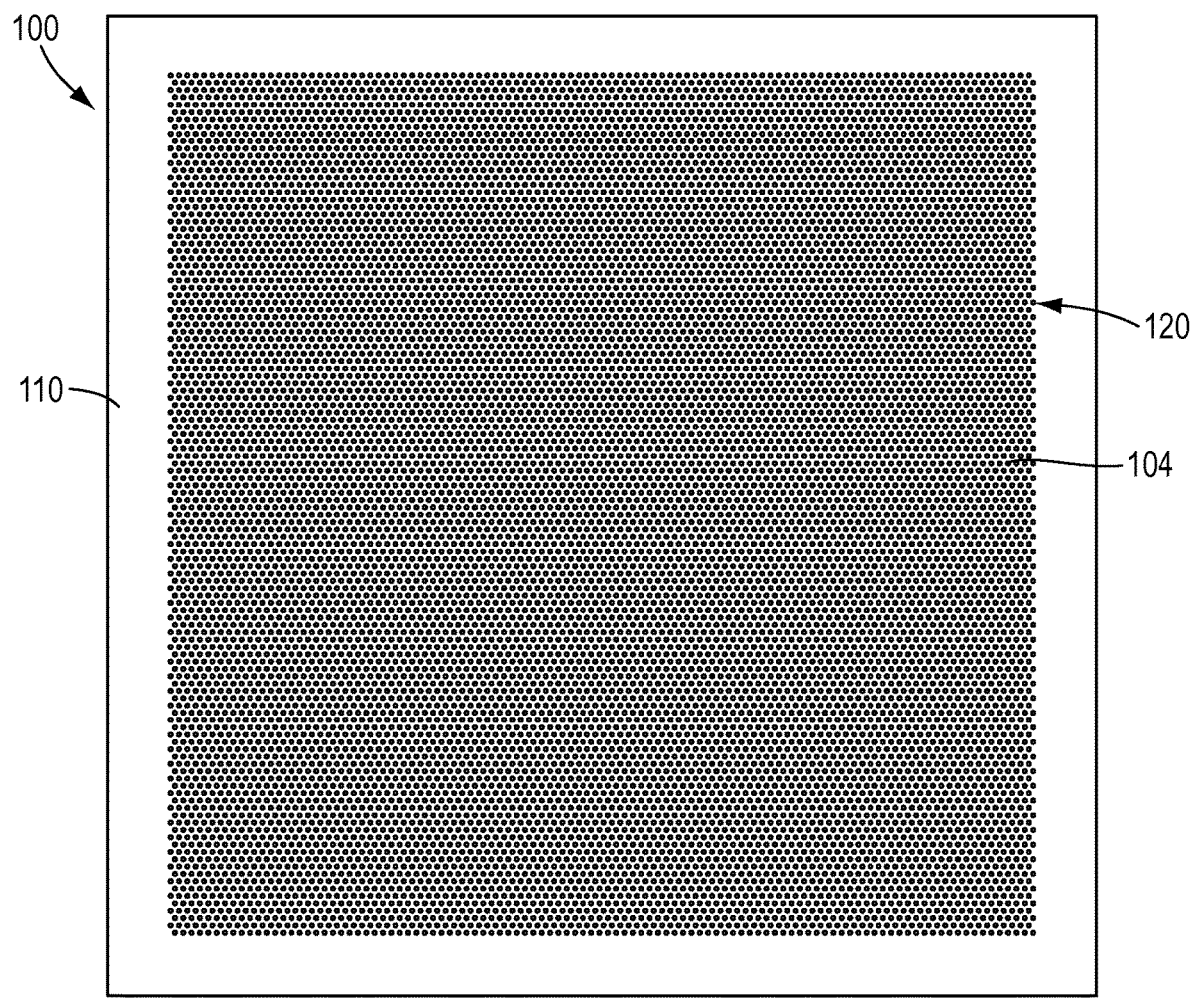
FIG. 1A illustrates an exemplary array in a substrate according to various embodiments described herein.

To provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

The present invention relates to a methods and systems for loading samples, sample volumes, or reactions volumes, into an array in a substrate, and more particularly to, loading samples into an array of individual reaction sites in a substrate.

In various embodiments, the devices, instruments, systems, and methods for loading samples into an article used to detect targets in a large number of small volume samples. These targets may be any suitable biological target including, but are not limited to, DNA sequences (including cell-free DNA), RNA sequences, genes, oligonucleotides, molecules, proteins, biomarkers, cells (e.g., circulating tumor cells), or any other suitable target biomolecule. In various embodiments, such biological components may be used in conjunction with various PCR, qPCR, and/or dPCR methods and systems in applications such as fetal diagnostics, multiplex dPCR, viral detection and quantification standards, genotyping, sequencing validation, mutation detection, detection of genetically modified organisms, rare allele detection, and copy number variation.

While generally applicable to quantitative polymerase chain reactions (qPCR) where a large number of samples are being processed, it should be recognized that any suitable PCR method may be used in accordance with various embodiments described herein. Suitable PCR methods include, but are not limited to, digital PCR, allele-specific PCR, asymmetric PCR, ligation-mediated PCR, multiplex PCR, nested PCR, qPCR, cast PCR, genome walking, and bridge PCR, for example.

As described below, according to various embodiments described herein, reaction sites may include, but are not limited to, through-holes, sample retainment regions, wells, indentations, spots, cavities, and reaction chambers, for example.

Furthermore, as used herein, thermal cycling may include using a thermal cycler, isothermal amplification, thermal convention, infrared mediated thermal cycling, or helicase dependent amplification, for example. In some embodiments, the chip may be integrated with a built-in heating element. In various embodiments, the chip may be integrated with semiconductors.

According to various embodiments, detection of a target may be, but is not limited to, fluorescence detection, detection of positive or negative ions, pH detection, voltage detection, or current detection, alone or in combination, for example.

Various embodiments described herein are particularly suited for digital PCR (dPCR). In digital PCR, a solution containing a relatively small number of a target polynucleotide or nucleotide sequence may be subdivided into a large number of small test samples, such that each sample generally contains either one molecule of the target nucleotide sequence or none of the target nucleotide sequence. When the samples are subsequently thermally cycled in a PCR protocol, procedure, or experiment, the sample containing the target nucleotide sequence are amplified and produce a positive detection signal, while the samples containing no target nucleotide sequence are not amplified and produce no detection signal. Using Poisson statistics, the number of target nucleotide sequences in the original solution may be correlated to the number of samples producing a positive detection signal.

Figure 23:
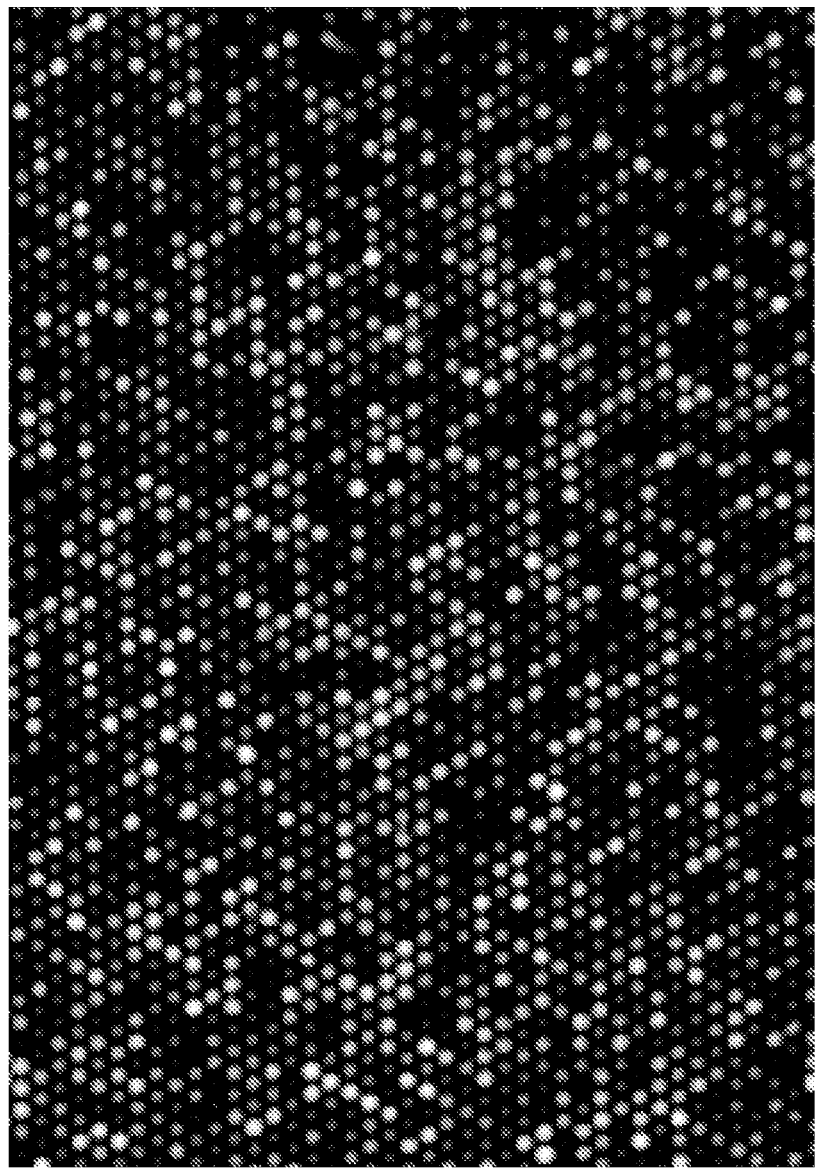
FIG. 23 illustrates a thermal cycling result of samples loaded according to various embodiments described herein.

An exemplary dPCR result on a chip according to embodiments described herein is shown in FIG. 23.

In order to conduct a typical dPCR protocol, procedure, or experiment, it is advantageous to be able to divide an initial sample solution into tens of thousands or hundreds of thousands of test samples each having a volume of several nanoliters, at or about one nanoliter, or less than one nanoliter, in a way that is simple and cost effective. Because the number of target nucleotide sequences may be very small, it may also be important in such circumstances that the entire content of the initial solution be accounted for and contained in the plurality of reaction sites.

Embodiments described herein solve these and other dPCR design constraints by distributing an initial sample solution into a plurality of reaction sites in a way that accounts for all, or essentially all, of sample solution.

For high throughput PCR assays and dPCR methods, a strategy of using an array format to reduce reaction volumes of liquid sample while increasing the number of reactions performed at one time may be employed. The array of reaction volumes of liquid sample may be in a substrate in a plurality of reaction sites. Reaction sites may be, but are not limited to, through-holes, wells, indentations, spots, cavities, reaction chambers, or any structure that may hold a sample, according to various embodiments described herein. In some embodiments, the through-holes or wells may be tapered in diameter.

Reduction in reaction volumes of liquid sample may allow for a higher density of reaction volumes so that more reactions can be performed within a given area. For example, an array of reaction sites comprised of 300 μm diameter through-holes in a substrate may contain about 30 nL of reaction volume. By reducing the size of each through-hole in an array to 60-70 μm in diameter, for example, each reaction volume may be 100 pL of liquid sample. According to various embodiments described herein, reaction volumes may range from about 1 pL to 30 nL of liquid sample. In some embodiments, an array of reaction sites may be comprised of a variety of different volume reaction sites to increase dynamic range. Furthermore, dynamic range may be increased by using more than one dilution of the liquid sample.

FIG. 1A illustrates a chip 100 including an array according to various embodiments described herein. Chip 100 may be referred to as an article, device, array, slide or platen, for example. Chip 100 comprises a substrate 110 and an array 120 of reaction sites. Substrate 110 may be various materials including, but not limited to, metal, glass, ceramic, silicon, for example. Array 120 includes a plurality of reaction sites 104. The plurality of reaction sites 104 may through-holes, wells, indentations, spots, cavities, or reaction chambers, for example. Each reaction site may also have a variety of cross-sectional geometries, such as round, triangular, or hexagonal, for example. Having other geometries may allow for more closely packed reaction sites to further increase the number of reactions in a given area.

Figure 1B:
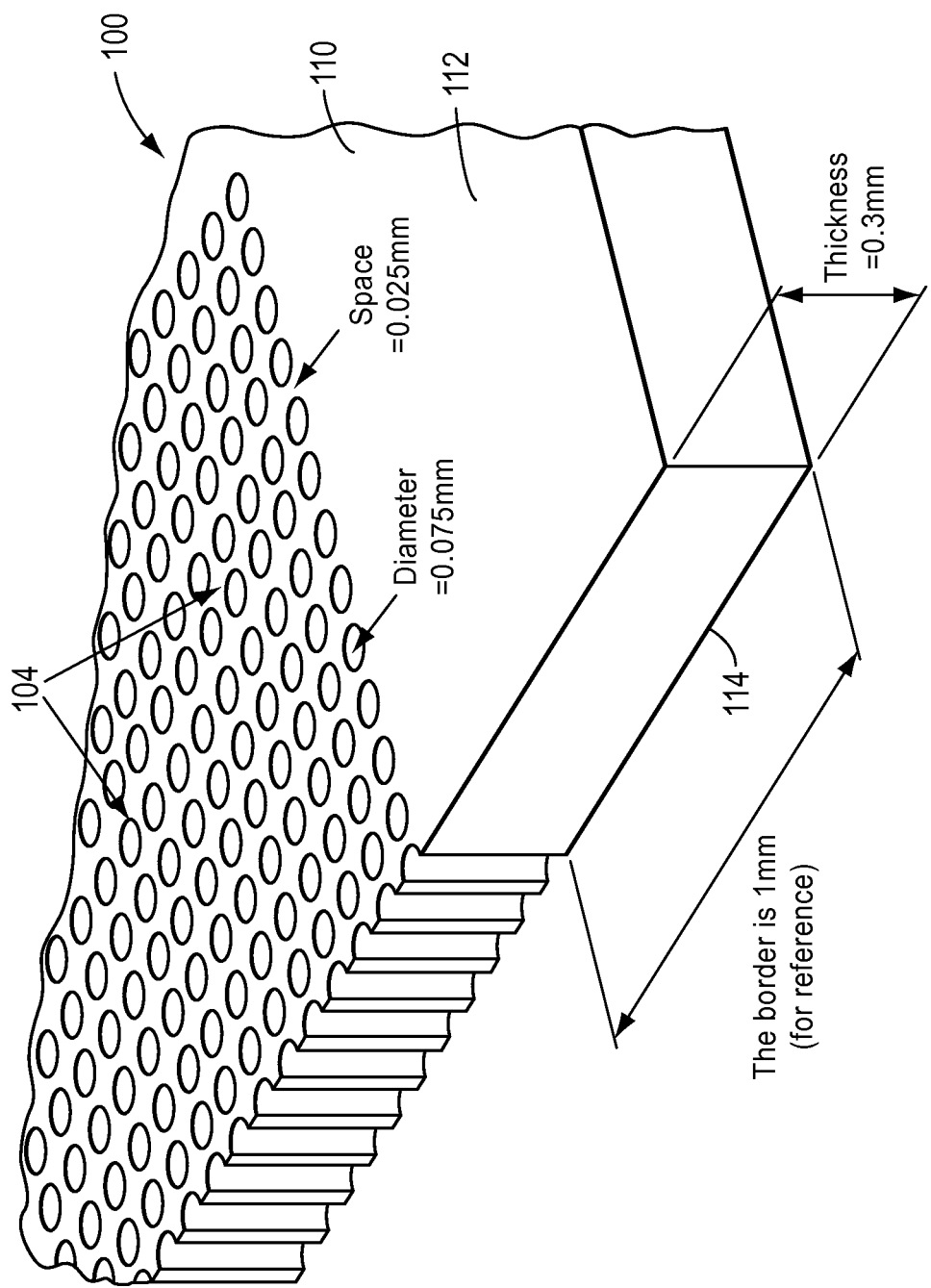
FIG. 1B illustrates a cut away view of an array in a substrate according to various embodiments described herein.

FIG. 1B illustrates a cross-sectional view of an array of reaction sites 104 according to various embodiments. Chip 100 has a first surface 112 and a second surface 114. Each reaction site 104 extends from an opening in first surface 112 to an opening in second surface 114. Reaction sites 104 may be configured to provide sufficient surface tension by capillary action to hold respective liquid samples containing a biological sample to be processed or examined. Chip 100 may have a general form or construction as disclosed in any of U.S. Pat. No. 6,306,578; 7,332,271; 7,604,983; 7,682,565; 6,387,331; or 6,893,877, which are herein incorporated by reference in their entirety as if fully set forth herein. In the example illustrated in FIG. 1B, the reaction site is a through-hole.

In various embodiments, first surface 112 and second surface 114 comprise a hydrophilic material, and surfaces of reaction sites 104 comprise hydrophilic material. In these embodiments, capillary action facilitates loading of liquid samples to the reaction sites. Further, capillary action holds the liquid sample in the reaction site.

In various embodiments, first surface 112 and second surface 114 comprise a hydrophobic material, and surfaces of reaction sites 104 comprise hydrophobic material. In these embodiments, capillary action facilitates loading of liquid samples to the reaction sites. Further, capillary action holds the liquid sample in the reaction site.

In some embodiments, surfaces of reaction sites 104 comprise hydrophilic material, while first surface 112 and second surface 114 comprise hydrophobic material. In this way, loading of liquid samples into reaction sites 104 is facilitated since the liquid sample will tend to the hydrophilic surfaces. Moreover, cross-contamination or cross-talk between liquid samples loaded in the reaction sites 104 is minimized. An array of such hydrophilic regions may comprise hydrophilic islands on a hydrophobic surface and may be formed on substrate 102 using a wide range of microfabrication techniques including, but are not limited to, depositions, plasmas, masking methods, transfer printing, screen printing, spotting, or the like.

In the illustrated embodiment, substrate 110 has a thickness between first surface 112 and second surface 114 of 300 micrometers, so that each reaction site 104 has a volume of about 1.3 nanoliters. Alternatively, the volume of each reaction site may be less than 1.3 nanoliters, for example, by decreasing the diameter of reaction sites 104 and/or the thickness of substrate 102.

Accordingly, each reaction site may have a volume that is less than or equal to 1 nanoliter, less than or equal to 100 picoliters, less than or equal to 30 picoliters, or less than or equal to 10 picoliters. In other embodiments, the volume some or all of the reaction sites is in a range of 1 to 20 nanoliters. According to various embodiments, the plurality of reaction sites may include a range of different volumes to increase dynamic range.

In certain embodiments, a density of reaction sites 104 may be at least 100 reaction sites per square millimeter. In other embodiments, there may be higher densities of reaction sites. For example, a density of reaction sites 104 within chip 100 may be greater than or equal to 150 reaction sites per square millimeter, greater than or equal to 200 reaction sites per square millimeter, greater than or equal to 500 reaction sites per square millimeter, greater than or equal to 1,000 reaction sites per square millimeter, or greater than or equal to 10,000 reaction sites per square millimeter.

In certain embodiments, a density of through-holes may be at least 100 reaction sites per square millimeter. In other embodiments, there may be higher densities of through-holes. For example, a density of through-holes within chip 100 may be greater than or equal to 150 through-holes per square millimeter, greater than or equal to 200 through-holes per square millimeter, greater than or equal to 500 through-holes per square millimeter, greater than or equal to 1,000 through-holes per square millimeter, or greater than or equal to 10,000 through-holes per square millimeter.

Other embodiments of chip 100 are further described in provisional applications 61/612,087, filed on Mar. 16, 2012, and 61/723,759, filed Nov. 7, 2012, which are incorporated herein for all purposes.

As mentioned above, reducing the size of a reaction site may lead to challenges associated with loading the liquid sample into each reaction site.

As mentioned above, it is desirable to load the liquid sample so that there is very little or no residual liquid sample. According to various embodiments described herein for loading a chip, at least 75% of the volume of the liquid sample applied to the chip for loading is loaded into the plurality of reaction sites. In some embodiments, at least 90% of the volume of the liquid sample applied to the chip for loading is loaded into the plurality of reaction sites. In various embodiments, the volume of liquid sample applied to the chip to be loaded is equal to the volume of the sum of volumes of the plurality of reaction sites on a chip. In some embodiments, the volume of liquid sample applied to the chip is the volume of the sum of volumes of the plurality of reaction sites on the chip minus the volume of one reaction site.

Figure 2:
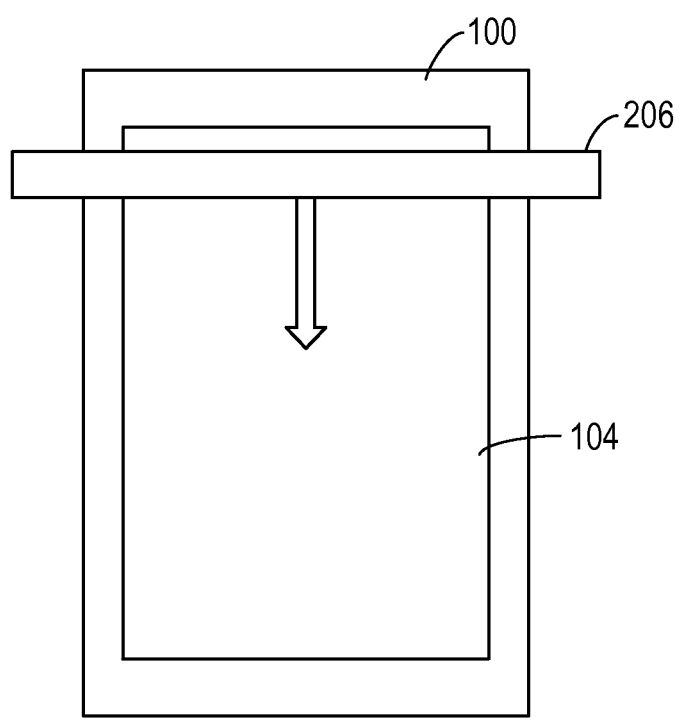
FIG. 2 illustrates loading of sample volumes in an array according to various embodiments described herein.

With reference to FIG. 2, according to various embodiments described herein, an array of reaction sites 104 may be loaded by depositing a volume of liquid sample onto chip 100. A sample loader 206 composed of a flexible material may be used to contact the array 104 and spread the liquid sample over array of reaction sites 104 with sufficient pressure to facilitate capillary loading of array 104. Sufficient pressure may be enough force to overcome the hydrophobic/hydrophilic characteristic of the surface when applied in a lateral sweeping manner. In some embodiments, sample loader 206 may be held stationary and chip 100 moved to spread the liquid sample over array 104. In other embodiments, chip 100 may be held stationary while sample loader 206 is moved over array 104 to load the array of reaction sites 104. Furthermore, in this way, excess liquid sample may also be removed from chip 100.

Further, according to various embodiments described herein, the plurality of reaction sites may be loaded as the chip is moved into a case or carrier. A case may help in preventing evaporation of the liquid samples and also increase stability of each reaction volume during thermal cycling.

FIGS. 3A, 3B, and 3C illustrate various views of an exemplary case 300 for loading an array of reaction sites according to various embodiments disclosed in this document. Case 300 may include a first portion 302 and a second portion 304. First portion 302 and second portion 304 are configured to be movably connected so that, in a closed position, first portion 302 and second portion 304 enclose chip 100.

Figure 4:
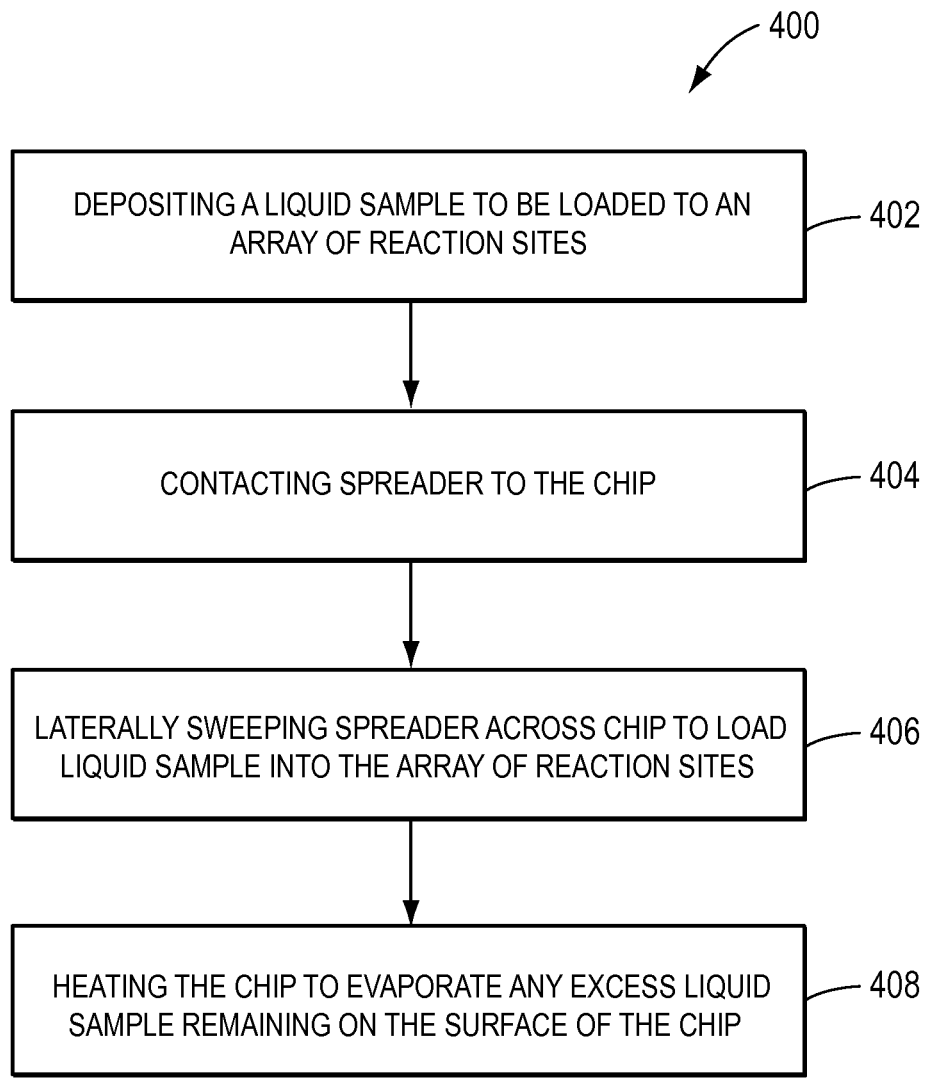
FIG. 4 illustrates an exemplary method of loading liquid samples into an array according to various embodiments described herein.
Figure 6:
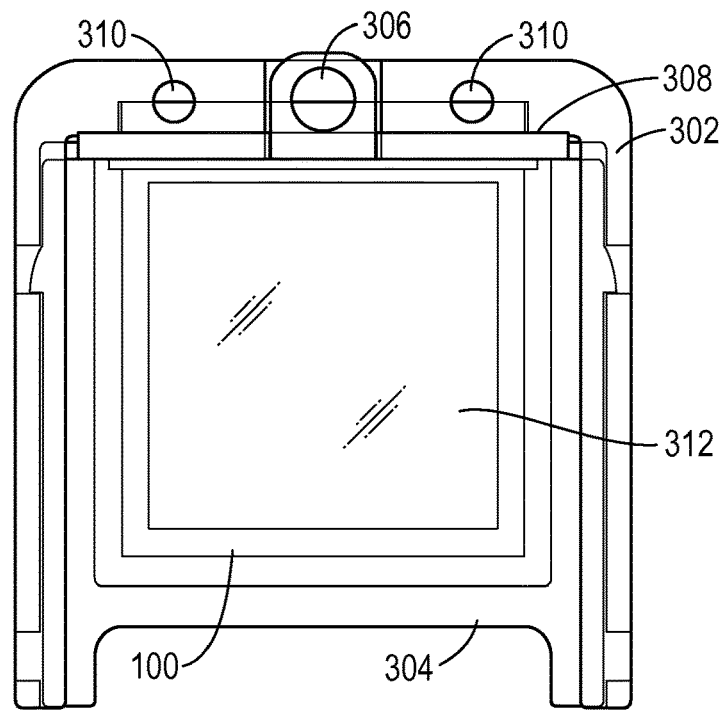
FIG. 6 illustrates one exemplary case for loading liquid samples into an array according to various embodiments of the present teachings.
Figure 7:
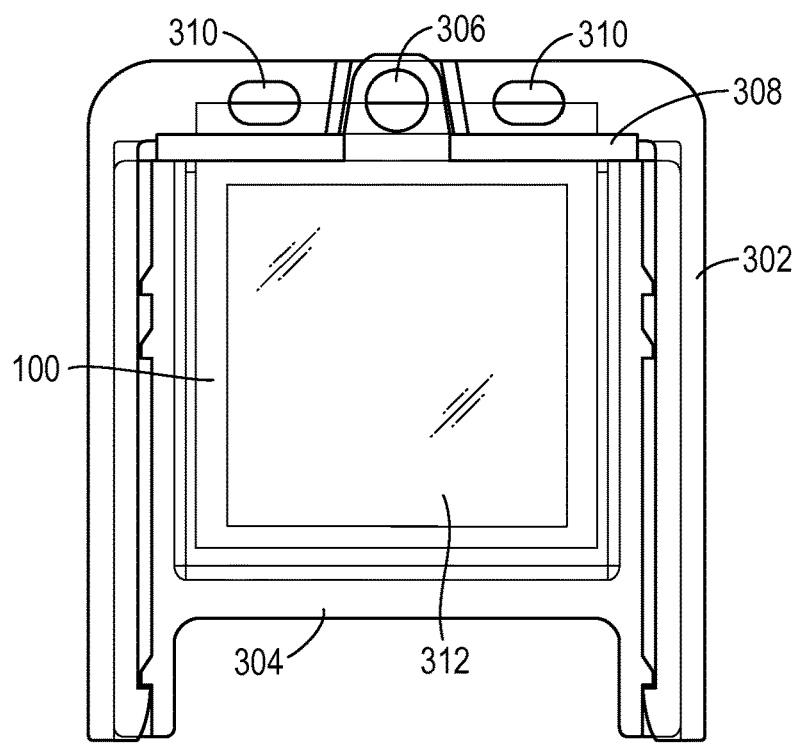
FIG. 7 illustrates another exemplary case for loading liquid samples into an array according to various embodiments of the present teachings.

According to various embodiments of the present teachings, a method for loading reaction sites in a chip is illustrated in FIG. 4. In step 402, a liquid sample is deposited to a sample loader. In various embodiments, the sample loader may have an access port to deposit the liquid sample such that the liquid sample is held in a reservoir within the sample loader. In other embodiments, the liquid sample is deposited directly onto the chip containing the array of reaction sites. In step 404, the sample loader is brought into contact with the chip. In step 406, the sample loader is laterally moved across the surface of the chip such that the liquid sample is brought into contact with the reaction sites with sufficient pressure to allow the capillary action of the reaction sites to load the reaction sites with the liquid sample. Step 408 may optionally be performed. In step 408, removal of any excess liquid sample that was deposited on the surface of the chip by the sample loader and was not loaded into a reaction site may be facilitated by application of heat. The chip may be heated by a heating surface. Removal of excess liquid sample may help reduce errors that may occur during amplification of the biomolecules within the liquid sample, for example.

With reference to FIG. 5B, first portion 302 may hold chip 100. In some embodiments, chip 100 may be held in first portion 302 of case 300 by an adhesive applied to ports 310. The adhesive may be a type of glue or UV adhesive, for example. In other embodiments, chip 100 may be held in first portion 302 by a fastener or clip, for example.

According to various embodiments, a funnel guide 308 is in a contiguous relationship to the second portion 304 of case 300 to facilitate the introduction of sample into the reaction sites of the chip 100. Funnel guide 308 may be a hydrophobic material sufficiently flexible to contact and apply pressure to chip 100 to load the reaction sites. Funnel guide 308 may be composed of silicone, RTV, polyurethane, natural rubber, other elastomers or polyolefins, for example. Funnel guide 308 is configured to spread the liquid sample over chip 100 to load the individual reaction sites as chip 100 is moved past funnel guide 308. Funnel guide 308 may also be configured to be a gasket.

In this fashion, the introduction of sample material, in the manner discussed in throughout this document and, in particular, FIG. 4, is facilitated and the minimum volume of sample needed may be reduced. In various embodiments, the funnel guide 308 is integrated into, or coupled to the case. Alternatively, the funnel guide 308 may be a separate or removable item.

Figure 9A:
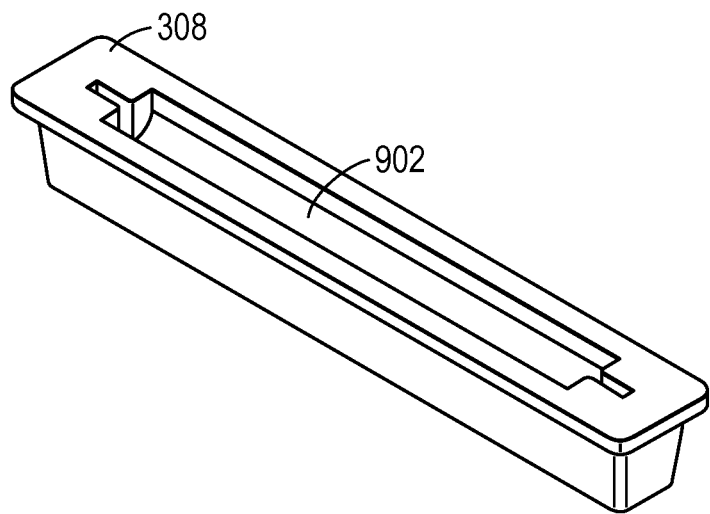
FIG. 9A illustrates one view of an exemplary funnel guide according to various embodiments of the present teachings.
Figure 9B:
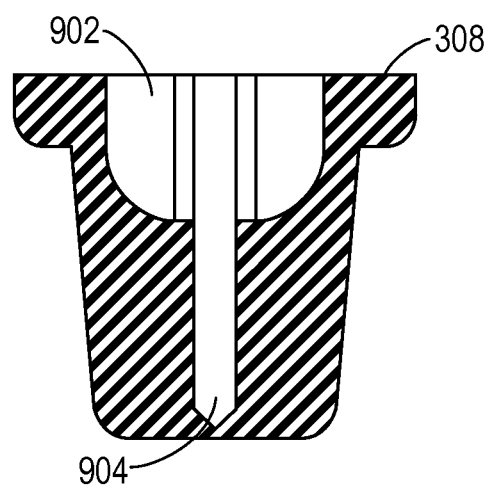
FIG. 9B illustrates a cross-sectional view of the exemplary funnel guide illustrated in FIG. 8A according to various embodiments of the present teachings.

Funnel guide 308 may be of various shapes and sizes. For example, in one embodiment, funnel guide 308 may take the form of a trough with a narrow slit 904, as illustrated in FIGS. 9A and 9B. Slit 904 is of a narrow enough width such that the liquid sample will not pass through it when the liquid sample is placed in the funnel guide 308. Slit 904 allows chip 100 to pass through into a resting volume 312 situated within a second portion 304 of the case. In some embodiments a thin membrane may cover slit 904 to keep resting volume 312 enclosed to keep debris or air out, for example. As chip 100 is inserted through funnel guide 308, chip 100 may break a membrane covering slit 904.

Also coupled to second portion 304 is a sample port 306. A liquid sample may be deposited in sample port 306 to load chip 100. The liquid sample deposited in sample port 306 may be held in funnel guide 308. Further the funnel guide 308 may be configured to receive sample material as several points along its length to facilitate loading of sample. Several sample loading ports along the length of the funnel guide may facilitate efficient loading of the liquid sample. Several loading ports along the length of the funnel guide may be configured to work with chip 100.

Figure 10:
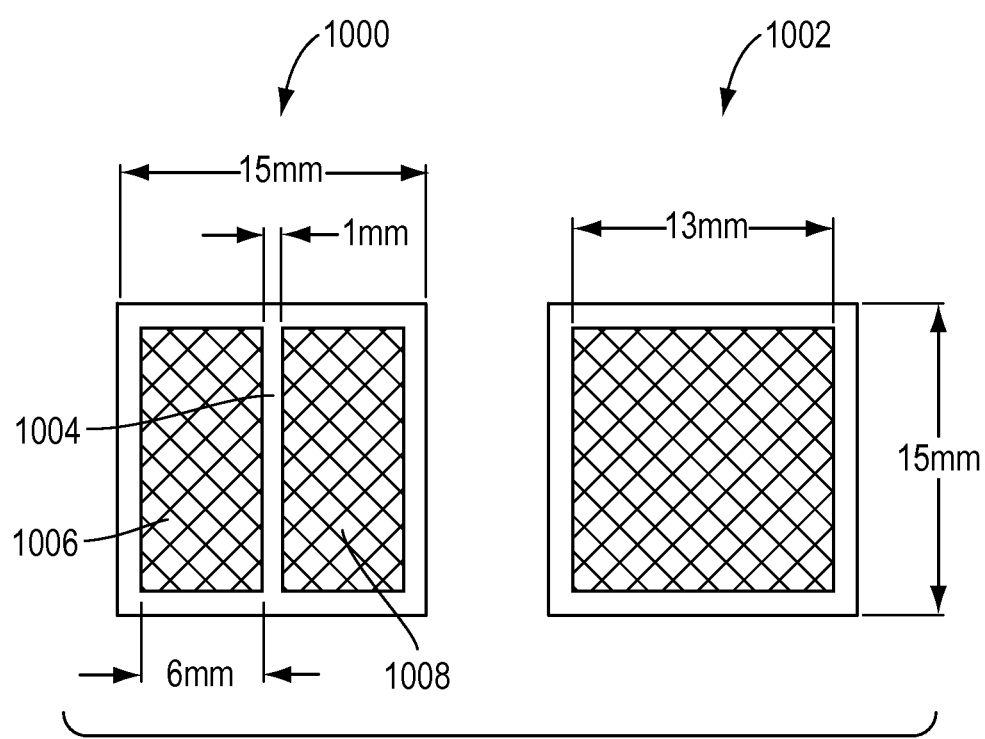
FIG. 10 illustrates an exemplary chip for loading more than one sample according to various embodiments of the present teachings.

Chip 100 may be subdivided into separate regions for loading multiple samples separate portions of the chip to increase throughput. FIG. 10 illustrates a chip 1000 that has been configured to include at least two samples. A partition 1004 separates a first array of reaction sites 1006 from a second array of reaction sites 1008. In this way, a chip may be loaded so that a first liquid sample is loaded into first array 1006 and a second liquid sample is loaded into second array 1008. In some embodiments, the first liquid sample may be at one dilution of the sample and the second liquid sample may be at another dilution of the sample.

In other embodiments, the first and second liquid samples may be loaded in chip 1000 by a case illustrated in FIGS. 3A-3C or FIGS. 8A-8B, for example. Using a case according to various embodiments, described herein, the liquid sample may be loaded into a funnel guide so they are loaded into the desired array on a chip. In contrast, chip 1002 illustrates a chip including a single array of a plurality of sample areas according to various embodiments.

As mentioned above, funnel guide 308 may have a configuration to form a trough-like well so that the liquid sample is held and contacts chip 100.

As mentioned above, second portion 304 may include a resting volume 312. Resting volume 312 is where the chip is held when case 300 is in the closed position. In various embodiments, resting volume 312 may be filled with an immersion fluid. An immersion fluid may also be referred to as an encapsulating medium. An encapsulating medium may be an immiscible fluid (e.g., a liquid or a gel) that does not mix with the liquid samples contained in reaction sites 104 and configured to prevent or reduce evaporation of the liquid samples contained in reaction sites 104.

According to various embodiments, the encapsulating medium may be polydimethyl siloxane (PDMS). The PDMS may be under-crosslinked to sufficiently encapsulate the reaction sites of chip 100 without contaminating the liquid samples loaded in the reaction sites.

PDMS has several characteristics that make it suitable for use with PCR. For example, PDMS is very low autofluorescing, thermally stable at PCR temperatures, and is non-inhibiting to polymerization processes. In addition, PDMS may contain an aqueous sample, but be gas permeable to water vapor.

The PDMS may be under-crosslinked, but fully cured. In one example, the encapsulating medium is PDMS with 0.8% by weight of a crosslinking agent added. Typically, a fully crosslinked PDMS has crosslinking agent added at 10% by weight. Other suitable encapsulating mediums may be other PCR compatible visco-elastic materials.

By under cross-linking the PDMS, it can function as a suitable encapsulant while retaining all of the attributes normally associated with the fully cross linked material. For example, the PDMS may be under cross-linked by using an amount of cross-linker that is less than 10 percent. For example, a cross link level of less than or equal to 1% meets certain design requirements for certain PCR applications, such as for certain dPCR applications. Multiple dPCR responses have been demonstrated using a flat plate 100 that is encapsulated with an amount of cross-linker that is less than or equal to 0.8%. Further, due to the higher viscosity of the under cross-linked PDMS material compared to Fluorinert, a PDMS encapsulation medium may lend itself packaging requirements and customer workflow solutions.

As chip 100 passes through the sample and slit of the funnel guide 308, the reaction sites will fill with sample and pass into the resting volume 312. If the resting volume 312 is filled with encapsulation medium prior to insertion of the chip 100, the amount of time that the filled reaction sites are exposed to air and the amount of evaporation of the samples is minimized.

The case may be fabricated from a range of materials that are compatible with the biological reactions, such as PCR compatible. For example, to be PCR compatible, the case may have low auto fluorescence, non-inhibiting to the PCR reaction, optically transparent to the excitation and detection wavelengths for PCR, and thermally stable at PCR temperatures. Examples of a material for the case may be, but is not limited to, polycarbonate, polystyrene, poly cyclic olefin, cyclic olefin, or other such polymeric materials.

In some embodiments, the resting volume 312 is within a pocket in the case. The pocket may be configured to contain the encapsulating medium within the resting volume 312. In some embodiments, the encapsulating medium may be preloaded into the pocket before chip 100 is inserted. Chip 100 may be pressed into the preloaded volume during which it becomes encapsulated by the encapsulating medium. During closure of the case, assembling first portion 302 with second portion 304, and encapsulating the chip 100 in the encapsulating medium within the resting volume 312, the gasket 308 may be further compressed by first portion 302 to form a seal of the resting volume 312.

In other embodiments, the pocket in resting volume 312 may be sealed and be void of air so that when chip 100 is pushed into resting volume 312, the pocket is opened. In this way, an oil-less method and case is used for the chip.

In various embodiments, funnel guide 308 may be composed of a polydimethyl silicone, or a like material. In some embodiments, a silicone oil may be also included in funnel guide 308. For example, the silicone oil may be PD5. With this polymer material, silicone oil is slowly released from the polymer matrix over time. The silicone oil may give funnel guide 308 lubricity so that chip 100 is more easily pushed through funnel guide 308. In these embodiments, funnel guide 308 is configured to spread the liquid sample over chip 100 to load the individual reaction sites as chip 100 is moved past funnel guide 308. Furthermore, the silicone oil may coat chip 100 as it is being loaded into case 300 to reduce or prevent evaporation of the samples. In some of these embodiments, an encapsulating medium may not be needed since the coating of silicone oil is sufficient to prevent loss of sample.

According to various embodiments, the immersion fluid may be, but is not limited to an elastomer, polymer, or oil. The immersion fluid may aid in loading, reduce sample evaporation, and prevent air bubbles. Air inside the case may interfere with the biological reactions of the samples or imaging inaccuracies, for example.

An example of an immersion fluid for some applications is Fluorinert, sold commercially by 3M Company. However, Fluorinert may be problematic for certain PCR applications due to its propensity to readily take up air that may be later released during PCR cycling, resulting in the formation of unwanted air bubbles.

FIG. 3B illustrates a case with chip 100 within the chip resting volume 312. First portion and second portion are in a closed position. FIG. 3C is another perspective view of a closed case according to various embodiments described herein.

FIG. 4 illustrates a flowchart depicting a method 400 of loading a plurality of reaction sites according to various embodiments described herein. In step 402, a liquid sample is deposited into a funnel guide. As depicted in FIGS. 9A and 9B, a funnel guide may be a trough-like shape to hold the liquid sample. According to various embodiments, the funnel guide may be composed of a hydrophobic material.

In step 404, the chip is inserted into the funnel guide, where the chip includes a substrate and a plurality of reaction sites as described above. The funnel guide is configured to contact the chip as the chip passes through the funnel guide.

In step 406, the chip is passed through the funnel guide to load the liquid sample into the plurality of reaction sites. The contact of the funnel guide facilitates the loading of the liquid sample into the reaction sites. As mentioned above, the funnel guide contacts the chip with enough force to overcome the hydrophobic/hydrophilic characteristics of the surface when applied in a lateral sweeping manner. In this way, the funnel guide also reduces the excess liquid sample that may be left on the substrate by keeping the excess within the funnel guide.

According to various embodiments described herein for loading a chip, at least 75% of the volume of the liquid sample applied to the chip for loading is loaded into the plurality of reaction sites. In some embodiments, at least 90% of the volume of the liquid sample applied to the chip for loading is loaded into the plurality of reaction sites. In various embodiments, the volume of liquid sample applied to the chip to be loaded is equal to the volume of the sum of volumes of the plurality of reaction sites on a chip. In some embodiments, the volume of liquid sample applied to the chip is the volume of the sum of volumes of the plurality of reaction sites on the chip minus the volume of one reaction site.

Furthermore, in various embodiments, the reaction sites and the substrate may be coated with, or composed of, hydrophobic material. In this way, capillary forces of the reaction sites are a substantial factor in the loading of the reaction sites with the liquid sample and containing the liquid samples within the reaction sites.

In some embodiments, the reaction sites may be coated with or composed of a hydrophilic material, while the substrate may be coated with or composed of a hydrophobic material. As such, in combination with the force provided by the funnel guide, loading of the liquid samples may be even more efficient. The chip may be coated with a various coating methods such as depositions, plasmas, masking methods, transfer printing, screen printing, spotting, or the like. Coating methods and characteristics are also described in provisional application No 61/723,738, filed on Nov. 7, 2012, which is incorporated herein for all purposes.

Figure 8A:
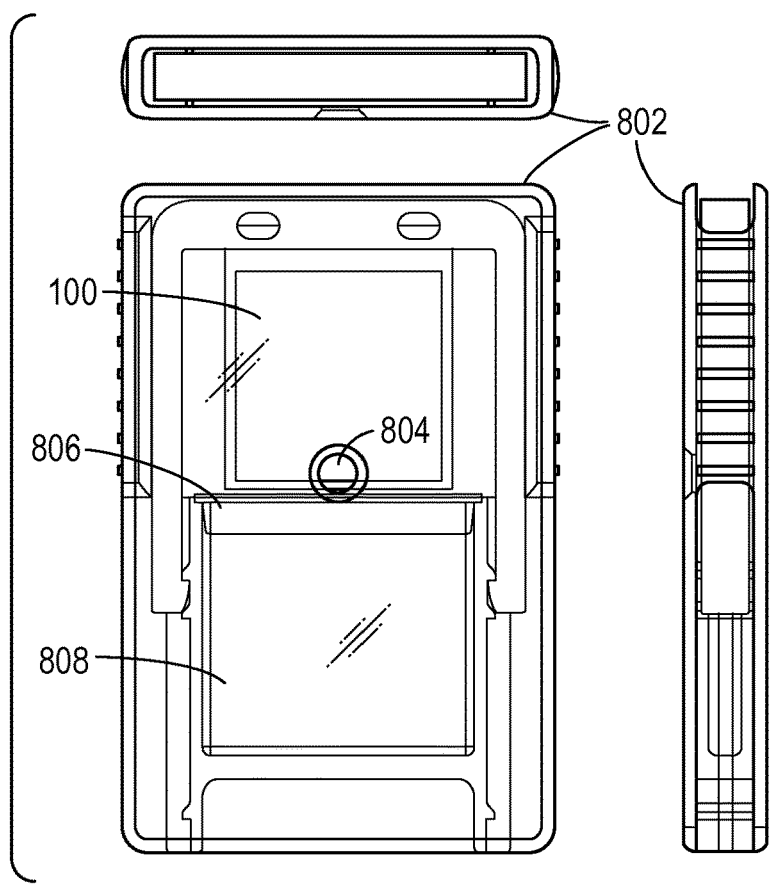
FIG. 8A illustrates yet another exemplary case for loading liquid samples into an array according to various embodiments of the present teachings.
Figure 8B:
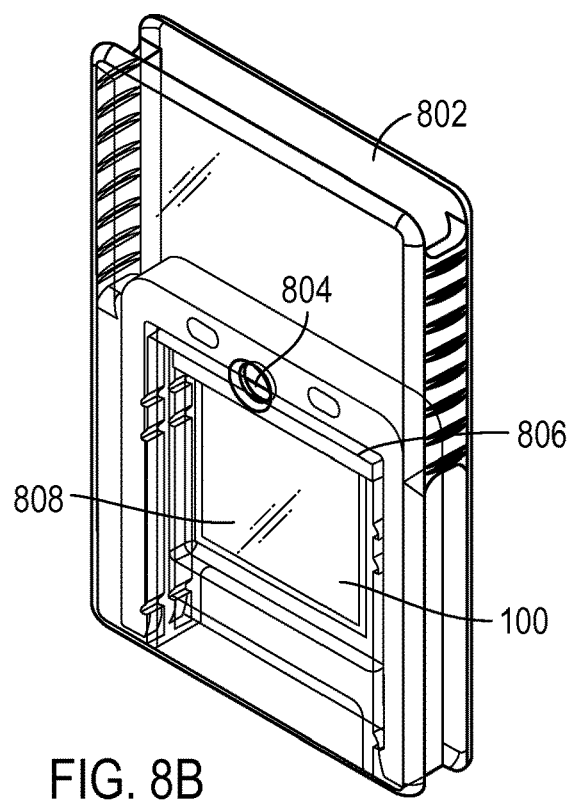
FIG. 8B illustrates another view of the exemplary case for loading liquid samples into an array illustrated in FIG. 8A according to various embodiments of the present teachings

FIGS. 8A and 8B illustrate another example of a case for loading a chip with an array of reaction sites according to various embodiments described herein. Case 802 includes a funnel guide 806 and a chip resting volume 808. Chip 100 is inserted into chip resting volume 808. Sample loading of chip 100 is facilitated by funnel guide 806. As described above, chip resting volume 808 may be filled with an immersion fluid, or encapsulating medium, to aid in minimizing evaporation of sample, cross-talk between samples, and air bubbles. FIG. 8B illustrates case 8B in a position where chip 100 is loaded and in chip resting area 808. In this case example, the top and bottom movable portions of case 802 are pre-assembled to reduce error associated with sliding the top and bottom portions together during closing of the case and loading of chip 100. Case 802 may increase ease in loading and encapsulation of chip 100.

Other methods may be used to load the plurality of reaction sites 104 in chip 100 according to various embodiments of the present teachings. For example, the plurality of reaction sites 104 may be vacuum loaded. For example, a chip may be within a case or material in negative pressure. The plurality of reaction sites are loaded by piercing the negative pressure filled case with needles filled with sample so that the liquid sample is drawn out of the needles into the reaction sites.

Furthermore, according to some embodiments, the chip may loaded by centrifugal forces. For example, the chip may be mounted on a rotating plate. The rotation of the plate may force the sample deposited on the chip through the through-holes of the chip.

Figure 11:
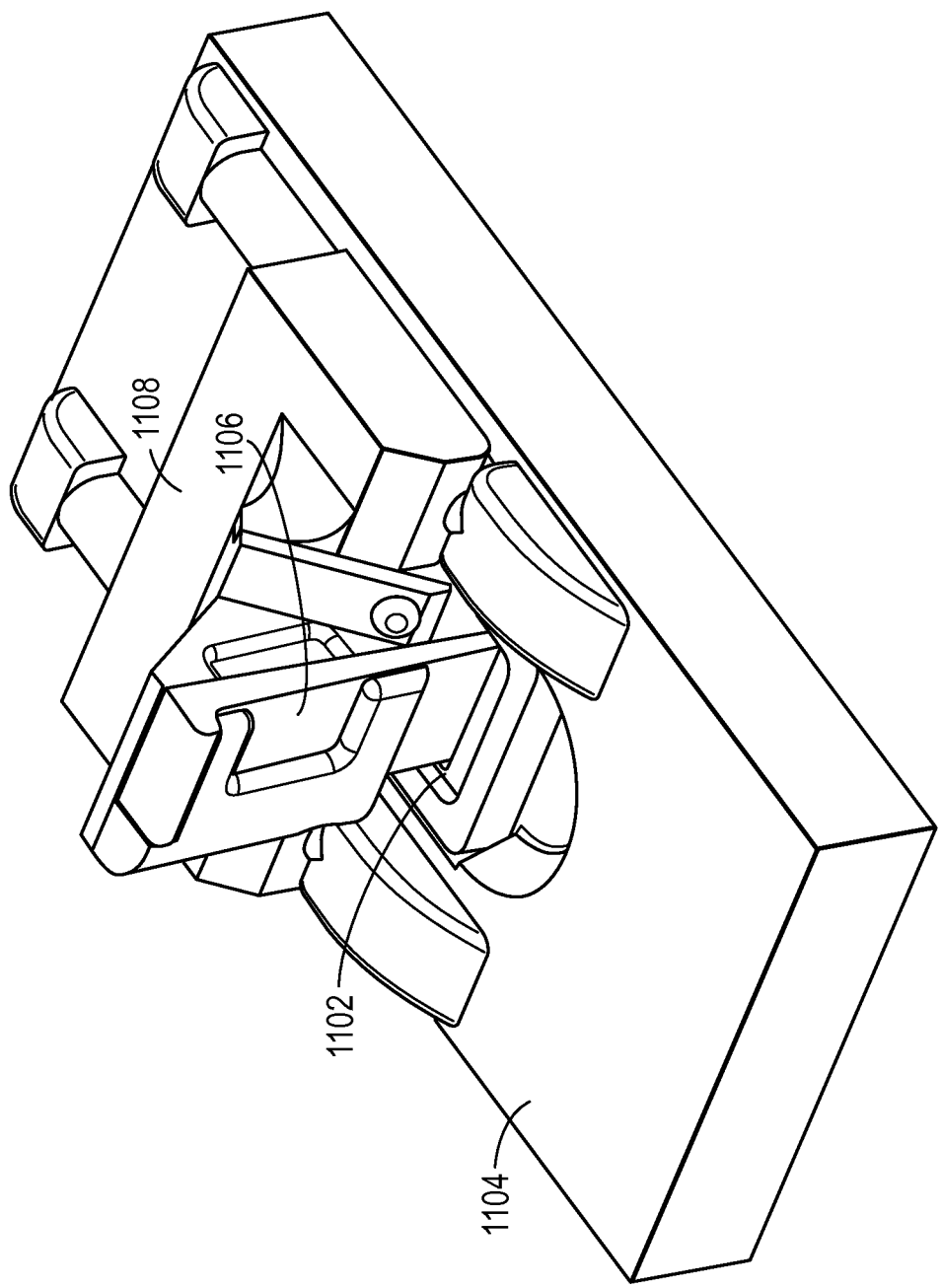
FIG. 11 illustrates a loading apparatus according to various embodiments of the present teachings.

Another exemplary loading apparatus is illustrated in FIG. 11. By using this apparatus, the loading motion may be more uniform across several loadings of the chip. Using the loading apparatus, a user may manually load a chip. Alternatively, the loading apparatus may be automated. The loading apparatus may include a chip holder 1102, where a chip to be loaded may be placed. The chip holder may be included in a loading base 1104. A sample loader 1106 may be place in a sample loader holder 1108. In this way, the sample loader 1106 is consistently positioned to load the chip. By moving the sample loader holder 1108 laterally over the chip, the sample loader will push the sample volume over the chip and load the reaction sites, as described above.

In various embodiments, a user may deposit the liquid sample on the chip. Then the user may hold the sample loader and laterally move the sample loader over the chip to load the liquid sample into the reaction sites. For both a manual and automated loading method, the sample loader may be positioned at an angle of 0-90 degrees to the chip while laterally moving over the chip to load the reaction sites.

It should be recognized that a sample loader, according to various embodiments described herein, may be composed of a variety of materials. For example, a sample loader may be composed of polyolefins, polyurethanes, siloxanes, or the like. In some embodiments, the sample loader may be composed of Dow 722, a low density polyethylene. However, it should be recognized that any material that will create a water contact angle of 5-179 degrees between the sample loader material and the liquid sample may be an acceptable material for the sample loader.

Liquid sample properties, sample loader material properties, and physical geometry of the sample loader along with the physical characteristics of the reaction sites and the hydrophobic/hydrophilic characteristics of the surfaces of the reaction sites as well as the chip are interactive and must all be taken into account as a complete system for the apparatus to load samples according to various embodiments of the present teachings.

The spreading of the liquid sample from the sample loader depends on the water contact angle of the liquid sample. The water contact angle results from the relationship of the material properties of the sample loader with the properties of the liquid sample. When the water contact angle is less than 90 degrees, the relationship between the liquid sample and the substrate surface is hydrophilic and the sample exhibits a cohesive interaction with the substrate surface, which is necessary for capillary action to pull the sample into the through holes. A substrate that is too hydrophilic, for example, with a water contact angle below 50 degrees, may lead to increased pooling of excess liquid sample on the substrate surface, or inefficient loading of reaction sites, for example. Further, low contact angles may cause the liquid sample to move into some reaction sites too quickly resulting in an uneven distribution of liquid sample in the plurality of reaction sites.

Conversely when the water contact angle is over 90 degrees, the relationship between the substrate surface and the liquid sample is hydrophobic and the liquid sample will not move into the reaction sites, because the capillary force will be negative. This situation may also lead to pooling of liquid sample on the substrate surface and prevent loading of some reaction sites with liquid sample. As such, surfaces of the substrate and the reaction sites are designed to balance the hydrophobicity and hydrophilicity of the substrate and reaction sites surfaces with respect to the liquid sample.

Figure 20:
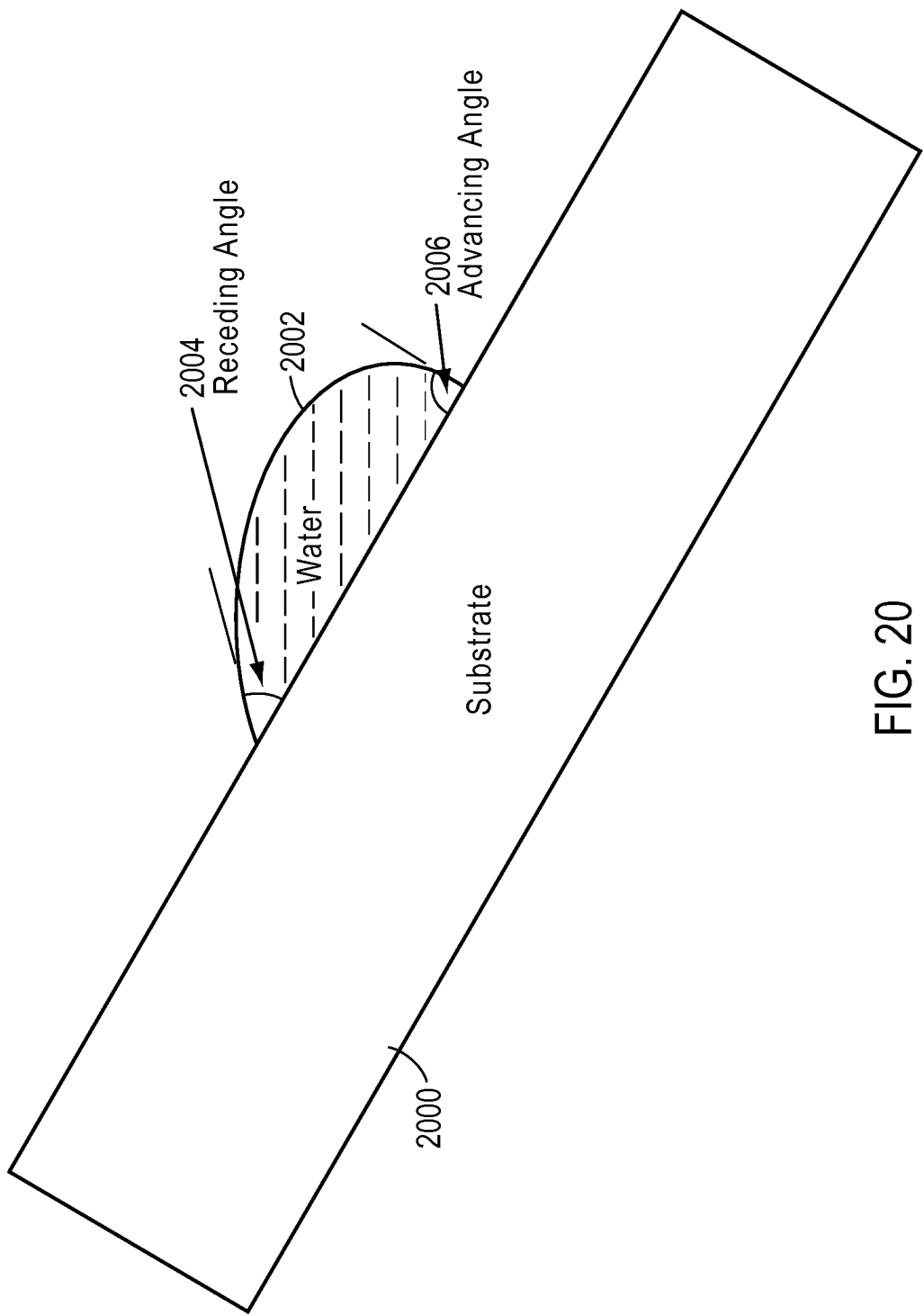
FIG. 20 illustrates a receding and advancing contact angles according to various embodiments of the present teachings.

With these characteristics in mind, according to various embodiments, efficient loading may be achieved by configuring the sample loader so that the advancing contact angle with the liquid sample is similar to the receding contact angle with the liquid sample. With reference to FIG. 20, advancing and receding contact angles are illustrated. A water droplet 2002 is shown on a substrate 2000. If the substrate is tilted, water droplet 2002 will have an advancing contact angle 2006 and a receding contact angle 2004.

According to various embodiments, the advancing contact angle is 85+/−15 degrees, and the receding contact angle is 85+/−15 degrees.

The downward force of the sample loader to the chip may be dependent on the material type, sample loader thickness, and chip thickness and material. However, the downward force may range from a force to contact the chip to a force needed to break the chip. (thickness of silicon would be taken into consideration as a factor). Furthermore, in various embodiments, the sweep rate of the sample loader across the chip may be from 2.0 sec/mm up to 0.2 sec/mm.

Figure 12:
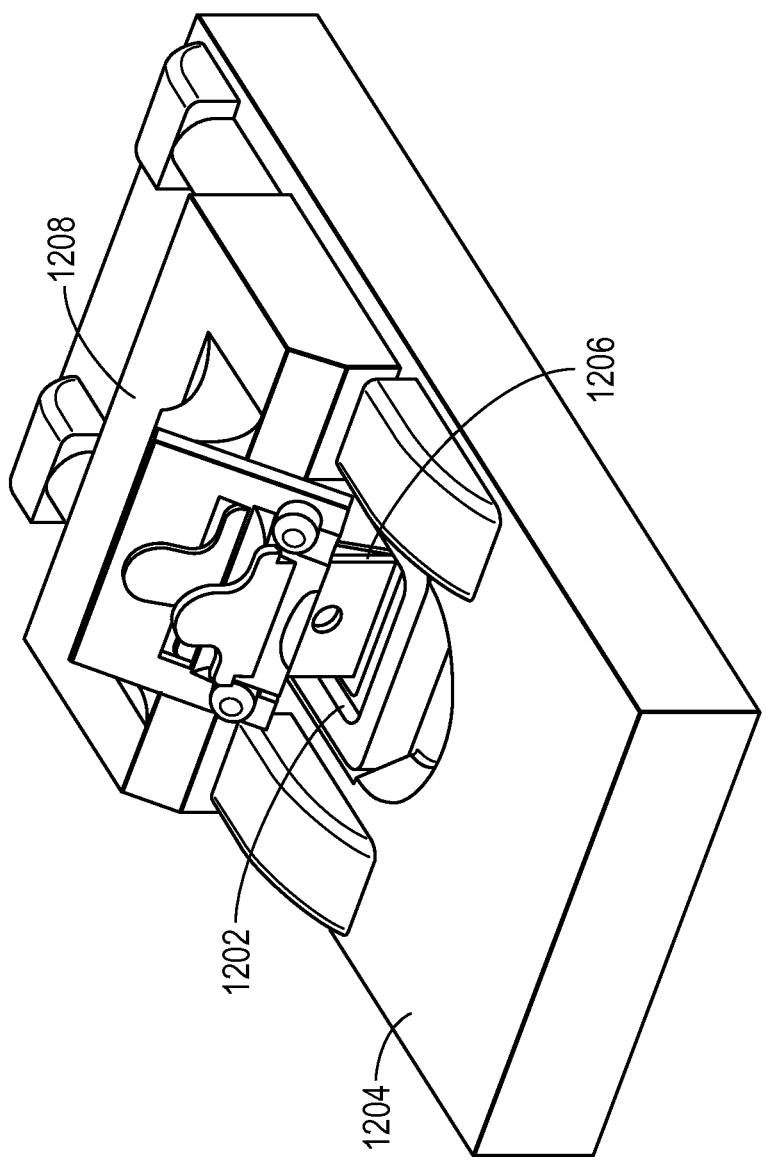
FIG. 12 illustrates another loading apparatus according to various embodiments of the present teachings.

In another exemplary embodiment of a loading apparatus shown in FIG. 12, a double sample loader 1208 may be used to load a chip. This loading apparatus may include a chip holder 1202, a loading base 1204 and a sample loader holder 1208 as in FIG. 11. Chip holder 1402 holds the chip to be loaded. Chip holder 1202 may be held in loading base 1204. Sample loader holder 1208 may hold the double sample loader 1206. In some embodiments, a user may manually push sample loader holder 1208 laterally over the chip in chip holder 1202. In other embodiments, the movement by sample loader holder 1208 may be automated by using a motor.

Double sample loader 1206 may increase the sample volume loaded into the plurality of reaction sites. In various embodiments, the sample volume to be loaded may be deposited between the two sample loaders of double sample loader 1206. In this way, each sample loader of double sample loader 1206 helps guide the sample volume to be loaded across the chip to load the plurality of reaction sites with the sample volume.

As mentioned above, loading the sample volume with the double sample loader may load at least 75% of the sample volume deposited on the chip within the reaction sites. In other embodiments, loading the sample volume with the double sample loader may load at least 90% of the sample volume deposited on the chip within the reaction sites. In other embodiments, loading the sample volume with the double sample loader may load 100% of the sample volume deposited on the chip within the reaction sites.

Figure 13:
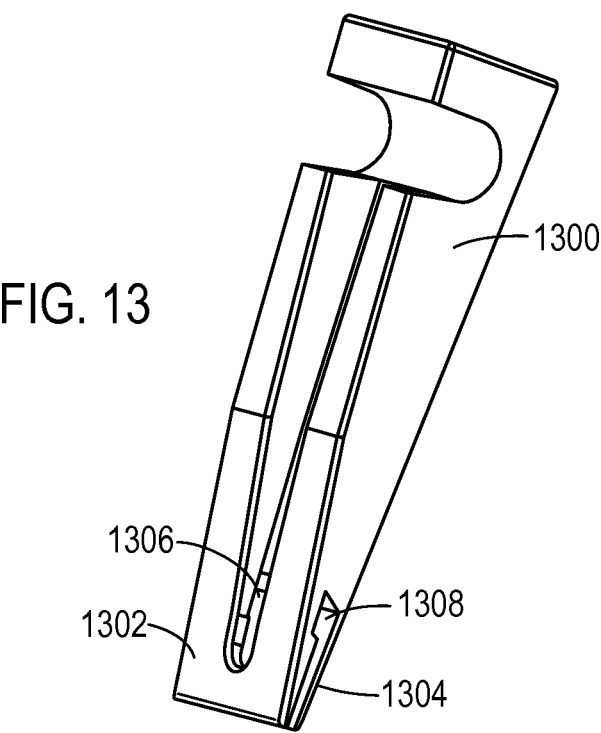
FIG. 13 illustrates a sample loader according to various embodiments of the present teachings.

FIG. 13 illustrates another sample loader 1300 according to various embodiments described herein. Sample loader 1300 may include a first blade 1302 and a second 1304. Sample loader 1300 may also include an access port 1306 where the liquid sample to be loaded into an array of reaction sites included in a substrate, such as a chip, may be deposited. The liquid sample deposited in access port 1306 may rest within a reservoir 1308 between first blade 1302 and second blade 1304 until the sample is loaded into the reaction sites. The liquid sample may flow within flow path 1310 to be dispensed at the end of the flow path, the tip of the sample loader 1300.

As mentioned above, sample loader 1300 may be held by a user to manually load reaction sites according to some embodiment. In other embodiments, sample loader 1300 may be installed in a loading apparatus and be used to load the reaction sites.

First blade 1302 and second blade 1304 are configured to taper toward each other so that the liquid sample wets along the edge of the width of first blade 1302 and second blade 1304. In this way, there may be even distribution of the liquid sample across the surface of the chip so that the liquid sample is efficiently loaded into the reaction sites as sample loader 1300 is swept across a chip.

Figure 21:
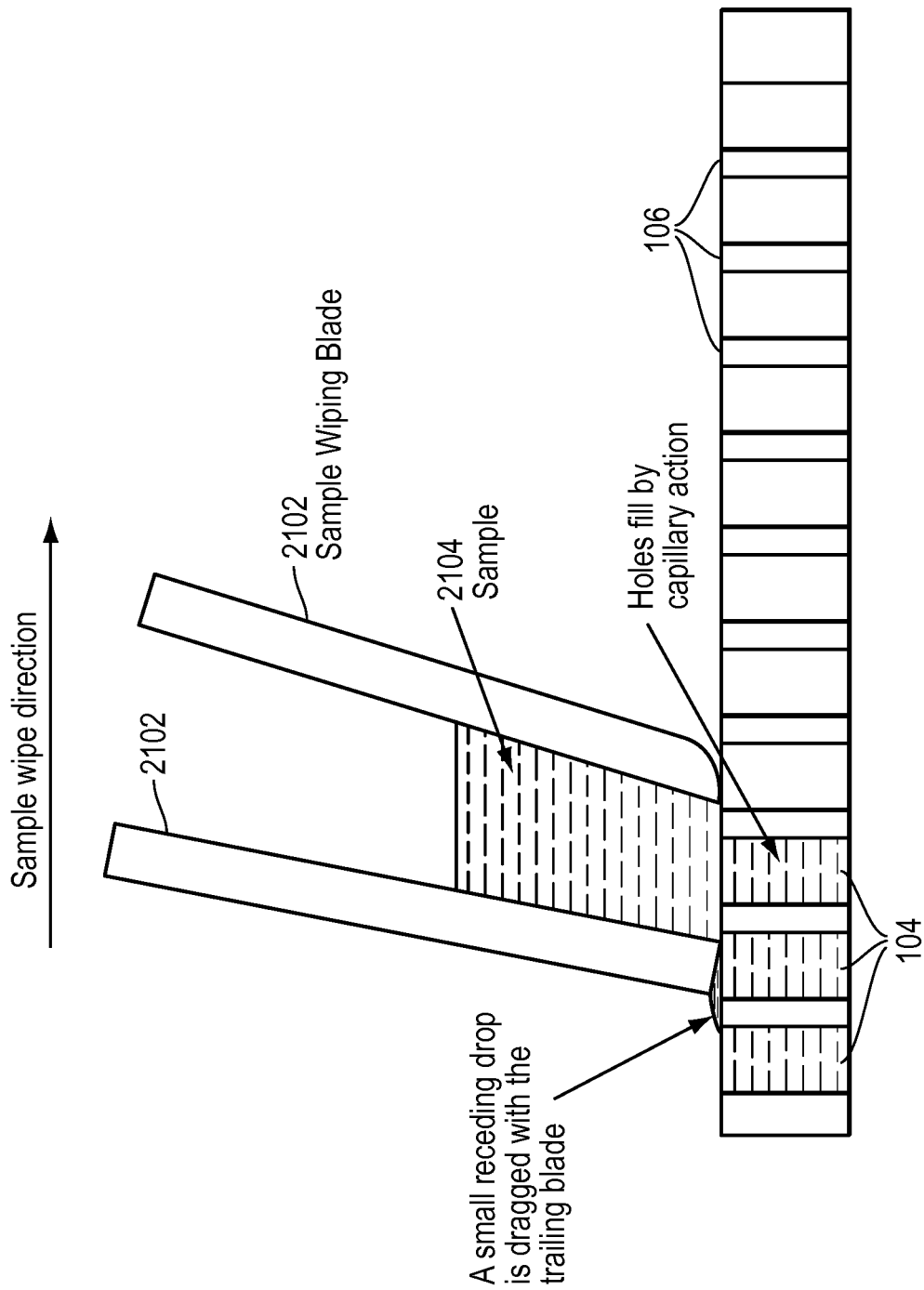
FIG. 21 illustrates loading of reaction sites by a sample loader according to various embodiments of the present teachings.
Figure 22:
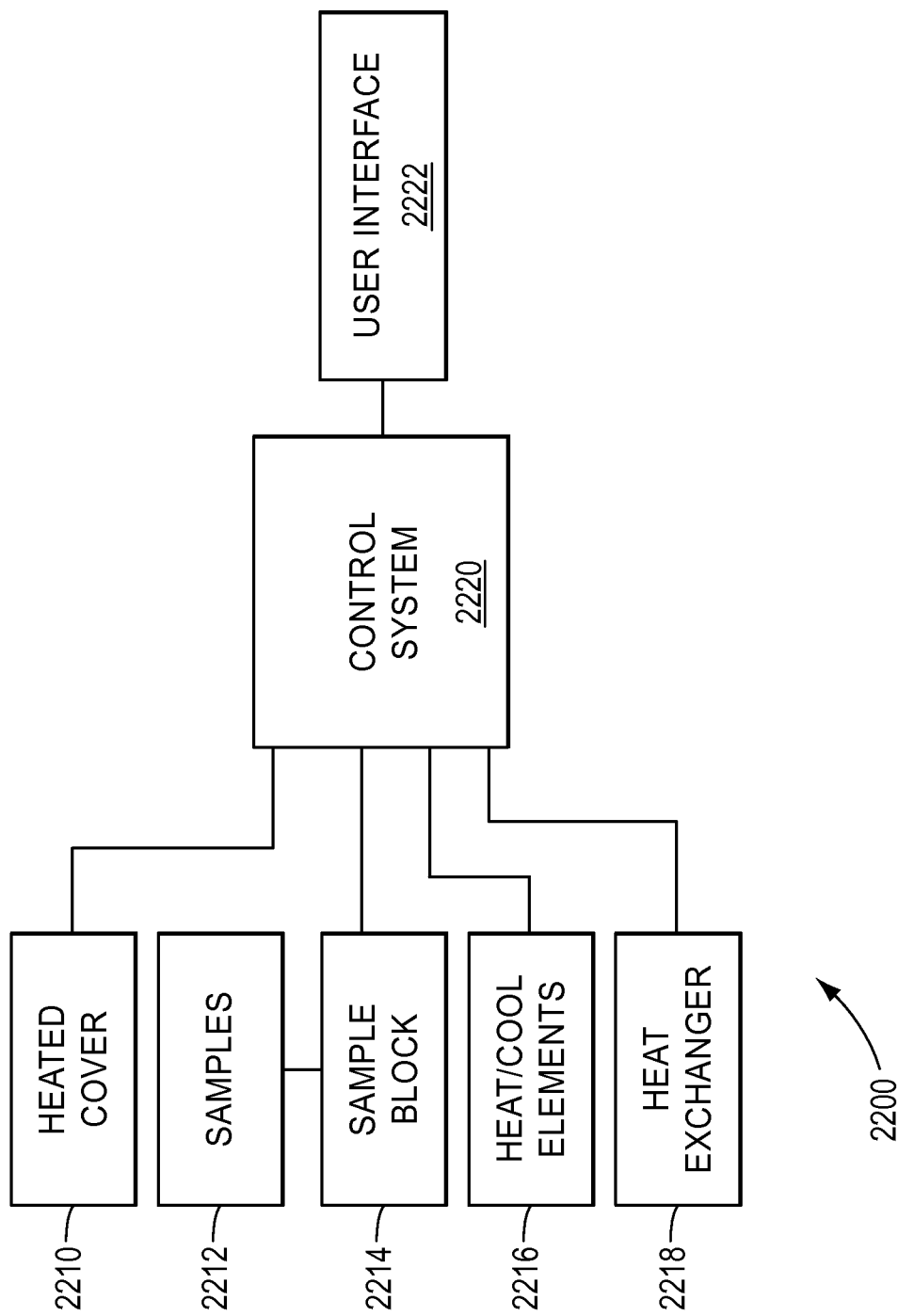
FIG. 22 is a block diagram that illustrates a polymerase chain reaction (PCR) instrument, upon which embodiments of the present teachings may be implemented.

With reference to FIG. 21, loading of reaction sites by a sample loader is illustrated according to various embodiments described herein. The liquid sample 2104 to be loaded into reaction sites 104 is within sample loader 2102. Sample loader 2102 is laterally moved across surface 106. As it is moved, liquid sample 2104 is loaded into reaction sites 104 by capillary action.

Figure 14A:
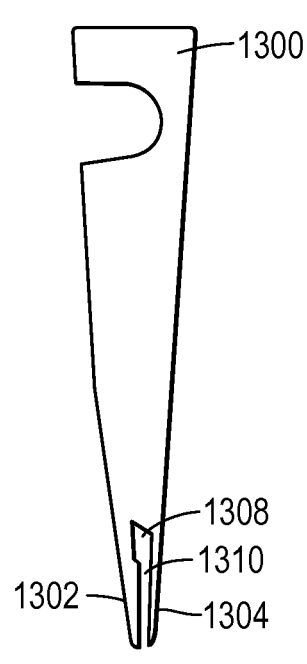
FIG. 14A illustrates a side-view of a sample loader according to various embodiments of the present teachings.

FIG. 14A illustrates a side view of sample loader 1300. In this view, reservoir 1308 is shown. When a liquid sample is deposited in the sample loader 1300, as described above, the liquid may rest in reservoir 1308 until the liquid sample is loaded into the reaction sites. The volume of liquid sample that may be deposited to reservoir 1308 may be 10-20 µL. In other embodiments, the volume of liquid sample loaded to the reaction sites may be from 0.5 µL to 100 µL. In yet other embodiments, the volume of liquid sample loaded to the reaction sites may be greater than 100 µL. The volume of liquid sample loaded to the reaction sites may depend on the characteristics of the material of the sample loader, the characteristics of the liquid sample, and the relationship between the sample loader and the liquid sample, as described above, for example.

Figure 14B:
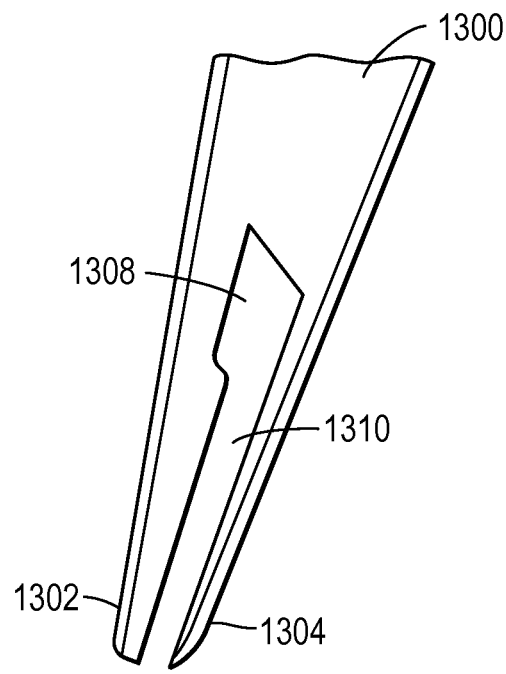
FIG. 14B illustrates a view of the tip of a sample loader according to various embodiments of the present teachings.

FIG. 14B illustrates an enlarged view of first blade 1302 and second blade 1304 of sample loader 1300. A tapering between first blade 1302 and second blade 1304 is shown. In various embodiments, the tapering angle may be from 0.1-15 degrees. In some embodiments, the tapering angle may be from 1.5-2 degrees. In various embodiments, the tapering can be so that the distance between first blade 1302 and second blade 1304 at the tip may be from 0.5 µm to 100 µm. In some embodiments, the distance between first blade 1302 and second blade 1304 may be 100 µm to 2 mm.

Further, according to various embodiments, the tip of sample loader 1300 may contact the chip at an angle of 65+/−3 degrees. According to various embodiments, the tip of sample loader 1300 may be deflected 0-0.004 inches when contacting the chip. Further the sweeping motion of sample loader 1300 across a chip may be linear. In other words, there will be minimal pitch, roll, or yaw. Spreader 1300 may move across the chip at a speed of 2-3 mm/sec, for example.

Figure 15:
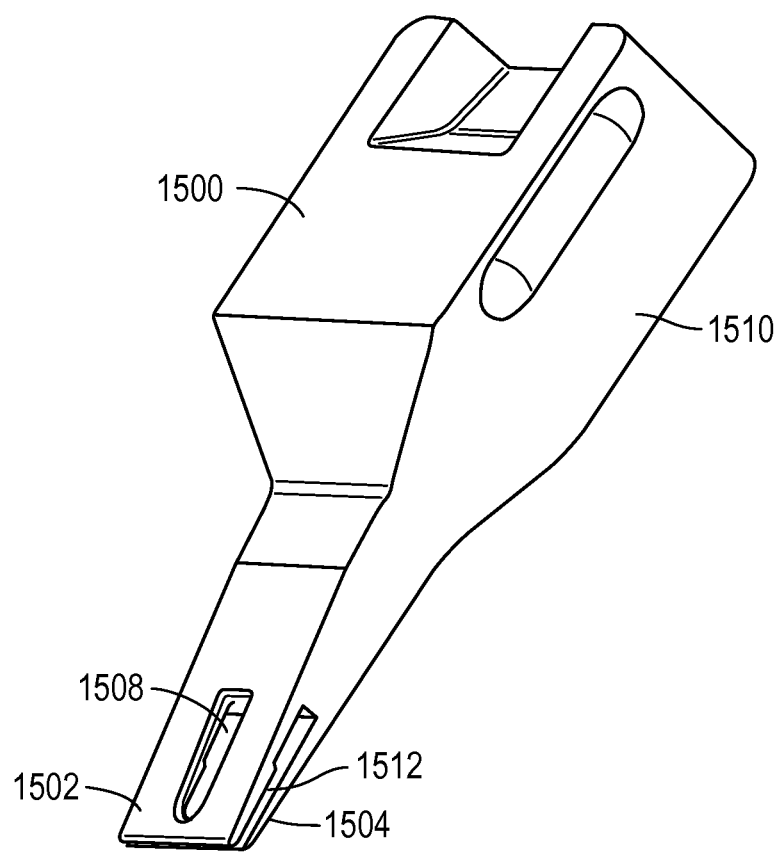
FIG. 15 illustrates another sample loader according to various embodiments of the present teachings.
Figure 16:
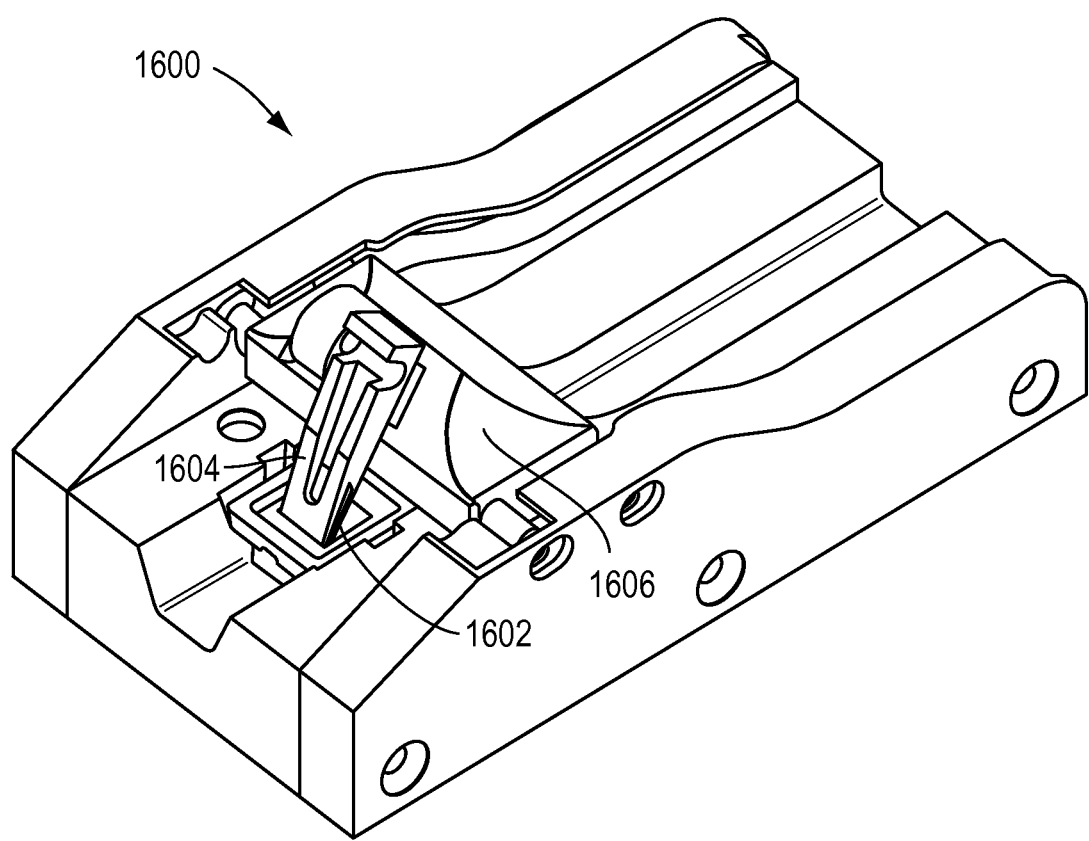
FIG. 16 illustrates another loading apparatus according to various embodiments of the present teachings.

FIG. 15 illustrates another sample loader 1500 according to various embodiments described herein. Sample loader 1500 may be connected to a loading apparatus, such as illustrated in FIG. 16. Similar to FIG. 13, sample loader 1500 may also have a first blade 1502 and second blade 1504. Also similar to FIG. 13, a liquid sample to be loaded into reaction sites may be deposited in access port 1508. The liquid sample may flow to the tip of sample loader 1500 through flow path 1512. Flow path 1512 is formed by first blade 1502 and second blade 1504.

An exemplary loading apparatus 1600 is shown in FIG. 16. Loading apparatus 1600 includes a sample loader 1604 installed on a sample loader holder 1606. The sample loader holder 1606 and sample loader 1604 assembly are configured to load a liquid sample into a chip 1602 including an array of reaction sites. In various embodiments, sample loader holder 1606 may be manually moved so that sample loader 1604 is laterally moved across chip 1602 to deposit the liquid sample over chip 1602, thus loading reaction sites in chip 1602. In other embodiments, sample loader holder 1606 may be mechanically controlled by a control system to moved sample loader 1604 over chip 1602.

As described with reference to FIG. 4, the chip may be heated in some embodiments to facilitate removal of excess liquid sample. Removal of excess liquid sample may help to reduce cross contamination, or bridging, between reaction sites. In various embodiments, other environmental factors, such as relative humidity, may be adjusted to facilitate loading of the liquid sample to the reaction sites.

Figure 17:
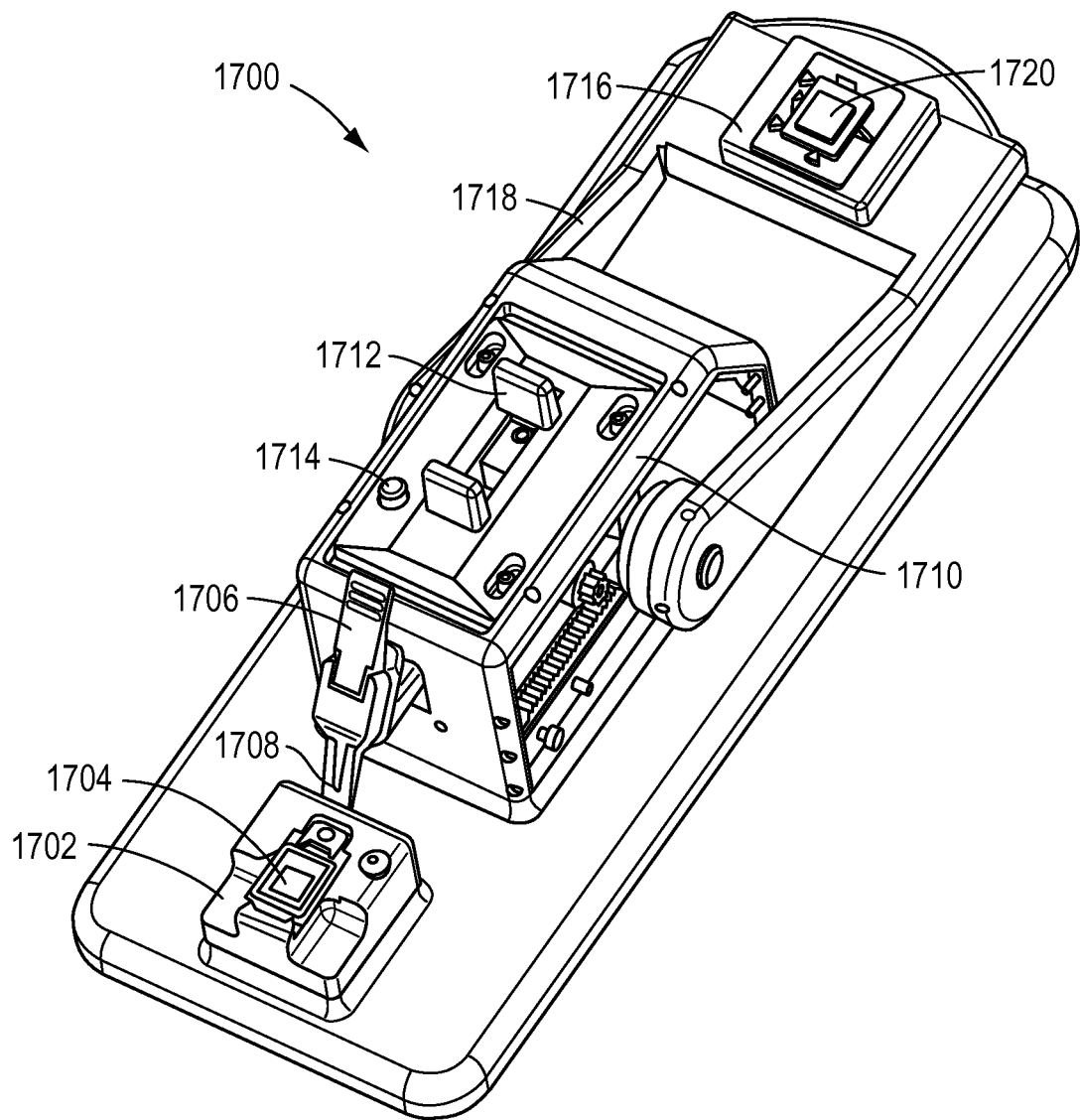
FIG. 17 illustrates another loading apparatus according to various embodiments of the present teachings.

FIG. 17 illustrates another loading apparatus 1700 according to various embodiments of the present teachings. Loading apparatus 1700 includes an assembly to load reaction sites on chip 1704 as well as an assembly to seal the chip into a case so that chip 1704 is enclosed to prevent contamination and easy handling of chip 1704. Loading apparatus 1700 includes a chip base 1702 configured such that chip 1704 may rest in a chip base 1702. Thus, chip 1704 is in a position such that sample loader 1708 can deposit a liquid sample to the reaction sites included in chip 1704. Sample loader 1708 is installed via a sample loader connecter 1706. Sample loader connecter 1706 may be a clip configured to clip sample loader 1708 into a position to contact chip 1704. Sample loader 1708 may need to be changed after one use or several uses to prevent contamination of samples.

Figure 18A:
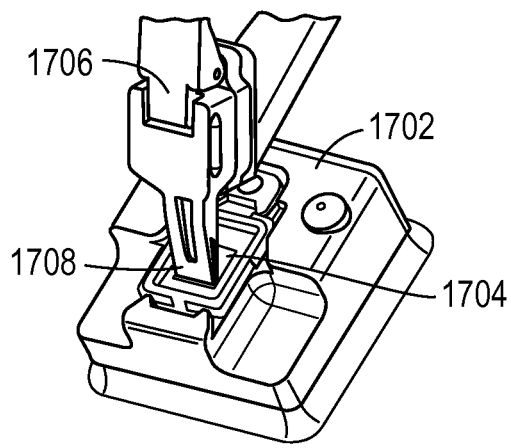
FIG. 18A-18C illustrate a loading method according to various embodiments of the present teachings.
Figure 18B:
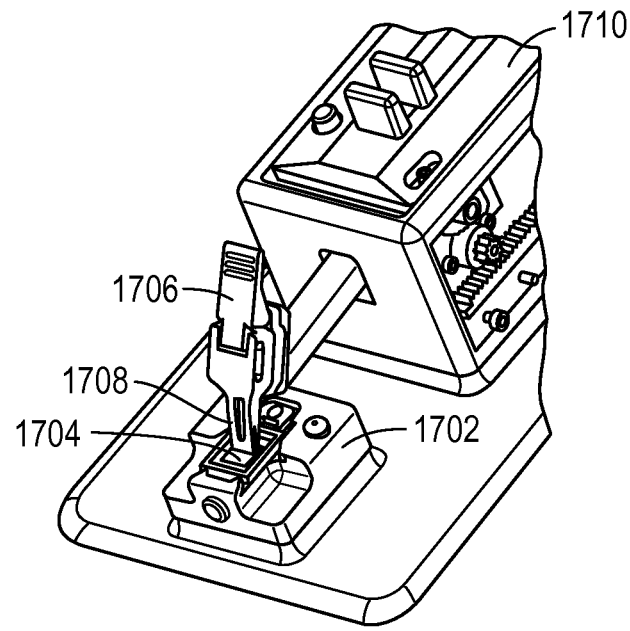
Figure 18C:
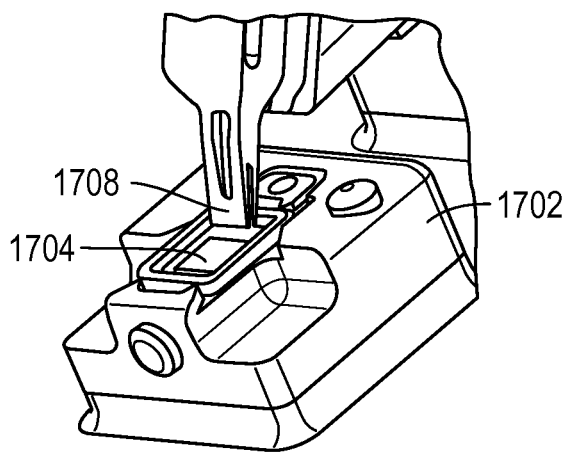

Sample loader connecter 1706 is coupled to mechanism housing 1710. Mechanism housing 1710 may enclose mechanisms for moving sample loader 1708 across chip 1704 to load the liquid sample to the reaction sites. Mechanisms enclosed in mechanism housing 1710 may include a spring and gears, configured to position sample loader 1708 to contact chip 1704 and to move sample loader 1708 laterally across chip 104. In some embodiments, activation of lever 1712 may position sample loader 1708 in an initial position to begin loading. According to various embodiments, a lever release button 1714 is activated to begin movement of sample loader 1708 across the chip to begin loading of the liquid sample. As lever 1712 is released, the mechanisms are configured to move sample loader 1708 across chip 1704. An example of loading a liquid sample to reaction sites is illustrated in FIGS. 18A-18C.

Loading apparatus 1700 may also include an assembly comprising an arm 1718 coupled to a nest 1716. Nest 1716 is configured to hold a cover 1720 to seal chip 1704. Mechanisms within mechanism housing 1710 will move arm 1718 so that cover 1720 covers chip 1704 after loading. A method of covering chip 1704 is shown in FIG. 19A-19B.

As mentioned above, FIGS. 18A-18C illustrate the process sample loader 1708 is moved across chip 1704 to load an array of reaction sites included in chip 1704. To begin the loading process, sample loader 1708 is positioned so that it contacts chip 1704 at one end, shown in FIG. 18A. A liquid sample is deposited into sample loader 1708. The loading mechanism contained in mechanism housing 1710 are actuated and sample loader 1708 is moved over chip 1704, as illustrated in FIG. 18B. Once sample loader has moved across chip 1704, depositing the liquid sample to the reaction sites, sample loader 1708 is lifted off chip 1704, as shown in FIG. 18C. In various embodiments, the loading method may be completed once to load the liquid sample. In other embodiments, the loading method of FIGS. 18A-18C may be repeated two times to ensure substantially complete loading of the liquid sample to the reaction sites. In other embodiments, the loading method illustrated in FIGS. 18A-18C may be completed a plurality of times.

According to various embodiments, the tip of sample loader 1708 may contact the chip at an angle of 65+/−3 degrees. According to various embodiments, the tip of sample loader 1708 may be deflected 0-0.004 inches when contacting the chip. Further the sweeping motion of sample loader 1708 across a chip may be linear. In other words, there will be minimal pitch, roll, or yaw. Sample loader 1708 may move across the chip at a speed of 2-3 mm/sec, for example. However, other speeds of moving sample loader 1708 to load the reaction sites are possible. Further, in various embodiments, sample loader 1708 may be moved over the reaction sites more than once to continue to load more reaction sites.

Figure 19A:
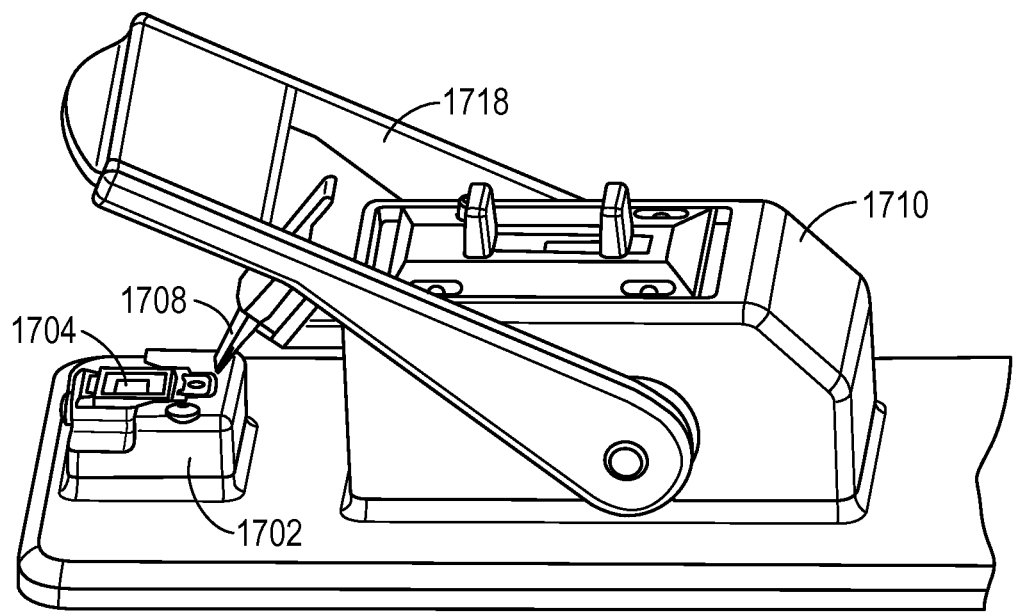
FIG. 19A-19B illustrate a case sealing method according to various embodiments of the present teachings.
Figure 19B:
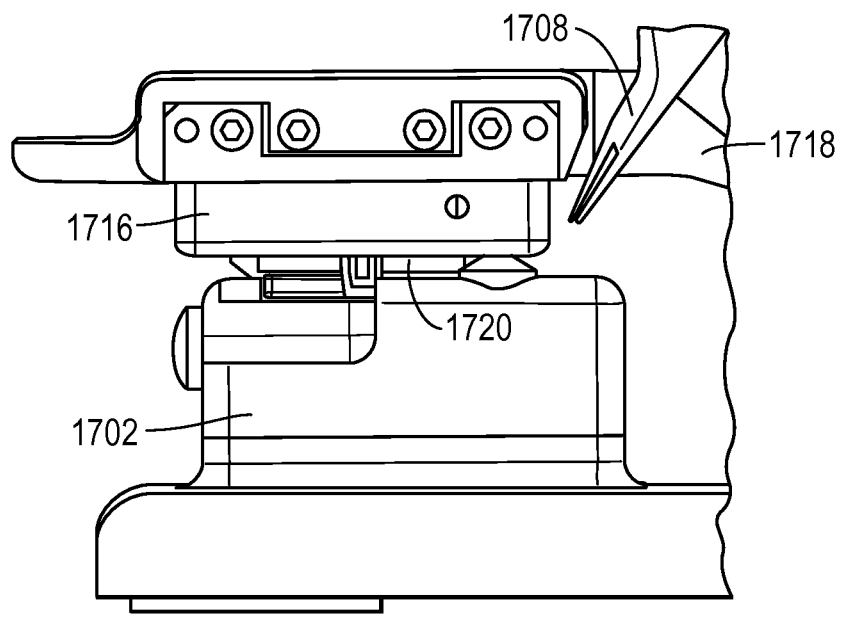

FIG. 19A-19B illustrates positioning a cover 1720 and sealing chip 1704 with cover 1720. FIG. 19A illustrates movement of arm 1718 toward chip 1704. FIG. 19B illustrates the assembly of arm 1718 and nest 1716, including cover 1720, contacting a base under the chip (not shown) to seal chip 1704 in a case comprised of a base and cover 1720. Arm 1718 provides enough downward force to attach cover 1720 over chip 1704. Cover 1720 may be coupled to a base, enclosing chip 1704, with tape or snaps, for example. When using snaps, in some embodiments, arm 1718 may deliver enough force to snap cover 1720 to a base.

As described above, loading apparatus 1700 may also include heating elements to heat the chip to facilitate removal of excess liquid sample that was not loaded into a reaction site. A heating element may be included in the chip base in various embodiments. Removal of excess liquid sample may reduce cross-contamination and bridging between reaction sites.

As mentioned above, an instrument that may be utilized according to various embodiments, but is not limited to, is a polymerase chain reaction (PCR) instrument. FIG. 20 is a block diagram that illustrates a PCR instrument 2000, upon which embodiments of the present teachings may be implemented. PCR instrument 2000 may include a heated cover 2010 that is placed over a plurality of samples 2012 contained in a sample support device (not shown). In various embodiments, a sample support device may be a chip, article, substrate, or glass or plastic slide with a plurality of reaction sites, which reaction sites have a cover between the reaction sites and heated cover 2010. Some examples of a sample support device may include, but are not limited to, a multi-well plate, such as a standard microtiter 96-well, a 384-well plate, or a microcard, or a substantially planar support, such as a glass or plastic slide. The reaction sites in various embodiments may include depressions, indentations, ridges, and combinations thereof, patterned in regular or irregular arrays formed on the surface of the substrate.

Once liquid sample volumes are loaded into the plurality of reaction sites, a biological reaction may be initiated within the reaction sites. In various embodiments, the biological reaction may be a PCR reaction. As such, the chip may be thermal cycled on a PCR instrument.

Various embodiments of PCR instruments include a sample block 2014, elements for heating and cooling 2016, a heat exchanger 2018, control system 2020, and user interface 2022. Various embodiments of a thermal block assembly according to the present teachings comprise components 2014-2018 of PCR instrument 2000 of FIG. 20.

In instruments configured for a certain sample support, an adaptor may be provided, so that PCR instrument 2000 may use chip 100 according to various embodiments. The adapter is configured to allow efficient heat transfer to the samples within chip 100.

For embodiments of PCR instrument 2000 in FIG. 20, control system 2020, may be used to control the functions of the detection system, heated cover, and thermal block assembly. Control system 2020 may be accessible to an end user through user interface 2022 of PCR instrument 2000 in FIG. 20. Also a computing system (not shown) may serve as to provide the control the function of PCR instrument 2000 in FIG. 20, as well as the user interface function. Additionally, a computing system may provide data processing, display and report preparation functions. All such instrument control functions may be dedicated locally to the PCR instrument, or computing system may provide remote control of part or all of the control, analysis, and reporting functions, as will be discussed in more detail subsequently.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Exemplary systems for methods related to the various embodiments described in this document include those described in following U.S. provisional patent applications: U.S. provisional application No. 61/612,087, filed on Mar. 16, 2012; and U.S. provisional application No. 61/723,759, filed on Nov. 7, 2012; and U.S. provisional application No. 61/612,005, filed on Mar. 16, 2012; and U.S. provisional application No. 61/612,008, filed on Mar. 16, 2012; and U.S. provisional application No. 61/723,658, filed on Nov. 7, 2012; and U.S. provisional application No. 61/723,738, filed on Nov. 7, 2012; and U.S. provisional application No. 61/659,029, filed on Jun. 13, 2012; and U.S. provisional application No. 61/723,710, filed on Nov. 7, 2012; and U.S. provisional application No. 61/774,499, filed on Mar. 7, 2013; and PCT International Application No. PCT/US2013/032002, filed Mar. 15, 2013; and PCT International Application No. PCT/US2013/032420, filed Mar. 15, 2013; and PCT International Application No. PCT/US2013/032107, filed Mar. 15, 2013; and PCT International Application No. PCT/US2013/032242, filed Mar. 15, 2013; and PCT International Application No. PCT/US2013/031890, filed Mar. 15, 2013.

All of these applications are also incorporated herein in their entirety by reference.

Although various embodiments have been described with respect to certain exemplary embodiments, examples, and applications, it will be apparent to those skilled in the art that various modifications and changes may be made without departing from the present teachings.

What is claimed is:

1. A method of loading a liquid sample into a plurality of reaction sites in a substrate, the method comprising:
   depositing a liquid sample to a reservoir of a sample loader;
   installing the sample loader on a sample loader connector connected to a mechanism housing of a loading apparatus, wherein the mechanism housing includes mechanisms configured to move and position the sample loader;
   providing a control system configured to mechanically control movement of the sample loader;
   activating a lever to position the sample loader in an initial position to begin loading, wherein positioning the sample loader in the initial position includes positioning the sample loader, using the mechanisms, to contact the sample loader to the substrate including the plurality of reaction sites; and
   activating a lever release button to begin movement of sample loader across the substrate, wherein the lever and lever release button are connected to the mechanisms; and
   laterally moving the sample loader, using the mechanisms controlled by the control system, over the plurality of reaction sites while contacting the sample loader to the substrate so that the liquid sample is deposited into the plurality of reaction sites, wherein laterally moving comprises moving the sample loader across the substrate with a sweeping motion.

2. The method of claim 1, wherein laterally moving the sample loader over the plurality of reaction sites draws the liquid sample into each reaction site by capillary action of the liquid sample.

3. The method of claim 1, wherein the sample loader comprises a first blade and a second blade, the reservoir being disposed between the blades, and wherein the method further comprises depositing the liquid sample from the reservoir and into to the plurality of reaction sites.

4. The method of claim 1, further comprising providing a substrate for which the liquid sample has an advancing contact angle of 85+/−15 degrees with sample loader.

5. The method of claim 1, further comprising providing a substrate for which the liquid sample has a hysteresis between an advancing contact angle and a receding contact angle that is between 0-30 degrees.

6. The method of claim 1, wherein the sample loader is composed of a material from the group consisting of: polyolefins, polyurethanes, and siloxanes.

7. The method of claim 3, wherein the liquid sample flows from the reservoir through a flow path between the first and second blade before being deposited into the plurality of reaction sites.

8. The method of claim 1, wherein the surfaces of the substrate and the plurality of reaction sites are hydrophilic.

9. The method of claim 1, wherein the plurality of reaction sites comprises a plurality of wells.

10. The method of claim 1, wherein the plurality of reaction sites comprises a plurality of through-holes.

11. The method of claim 1, wherein the plurality of reaction sites comprises a two-dimensional array of reaction sites.

12. The method of claim 11, wherein depositing the liquid sample comprising depositing the liquid sample into a row of the reaction sites simultaneously.

13. The method of claim 1, further comprising depositing liquid sample into a plurality of the reaction sites simultaneously.

14. The method of claim 1, wherein the plurality of reaction sites each have a volume of about 1 nano liter.

15. The method claim 1, wherein laterally moving the sample loader comprises a sweeping motion of the sample loader over the plurality of reaction sites.

16. The method of claim 1, wherein the mechanisms include a spring and a plurality of gears.

17. A method of loading a liquid sample into a plurality of reaction sites in a substrate, the method comprising:
   installing a sample loader comprising a reservoir containing liquid sample on a sample loader connector, the sample loader connector connected to a mechanism of a loading apparatus configured to move and position the sample loader;
   providing a control system configured to mechanically control movement of the sample loader;
   activating a lever to position the sample loader in an initial position to begin loading, wherein positioning the sample loader in the initial position includes positioning the sample loader, using the mechanisms, to contact the sample loader to the substrate; and
   activating a release to begin movement of sample loader across the substrate, wherein the lever and the release are connected to the mechanism; and
   using the mechanism, laterally moving the sample loader over the plurality of reaction sites with a sweeping motion while contacting the sample loader to the substrate so that the liquid sample is deposited into the plurality of reaction sites.

* * * * *